US012485129B2

(12) United States Patent
Levy

(10) Patent No.: US 12,485,129 B2
(45) Date of Patent: *Dec. 2, 2025

(54) WATER SOLUBLE COMPOSITIONS COMPRISING PURIFIED CANNABINOIDS

(71) Applicant: CANOPY GROWTH CORPORATION, Smiths Falls (CA)

(72) Inventor: Kurt Aron Levy, Superior, CO (US)

(73) Assignee: Canopy Growth Corporation, Smiths Falls (CA)

( * ) Notice: Subject to any disclaimer, the term of this patent is extended or adjusted under 35 U.S.C. 154(b) by 1140 days.

This patent is subject to a terminal disclaimer.

(21) Appl. No.: 17/387,875

(22) Filed: Jul. 28, 2021

(65) Prior Publication Data

US 2021/0353589 A1 Nov. 18, 2021

Related U.S. Application Data

(63) Continuation-in-part of application No. 17/352,032, filed on Jun. 18, 2021, which is a continuation of application No. 17/024,601, filed on Sep. 17, 2020, now Pat. No. 11,510,897, which is a continuation of application No. 16/860,589, filed on Apr. 28, 2020, now Pat. No. 10,842,773, which is a continuation of application No. 16/700,678, filed on Dec. 2, 2019, now Pat. No. 10,722,490, which is a continuation of application No. 16/328,833, filed as application No. PCT/US2017/049219 on Aug. 29, 2017, now Pat. No. 10,568,865.

(60) Provisional application No. 62/380,954, filed on Aug. 29, 2016.

(51) Int. Cl.
| A61K 31/335 | (2006.01) |
| A61K 9/08 | (2006.01) |
| A61K 9/107 | (2006.01) |
| A61K 31/00 | (2006.01) |
| A61K 31/01 | (2006.01) |
| A61K 31/015 | (2006.01) |
| A61K 31/045 | (2006.01) |
| A61K 31/065 | (2006.01) |
| A61K 31/105 | (2006.01) |
| A61K 31/122 | (2006.01) |
| A61K 31/192 | (2006.01) |
| A61K 31/352 | (2006.01) |
| A61K 31/353 | (2006.01) |
| A61K 31/355 | (2006.01) |
| A61K 36/185 | (2006.01) |
| A61K 45/06 | (2006.01) |
| A61K 47/22 | (2006.01) |

(52) U.S. Cl.
CPC ............. *A61K 31/658* (2023.05); *A61K 9/08* (2013.01); *A61K 9/107* (2013.01); *A61K 31/01* (2013.01); *A61K 31/015* (2013.01); *A61K 31/045* (2013.01); *A61K 31/065* (2013.01); *A61K 31/105* (2013.01); *A61K 31/122* (2013.01); *A61K 31/192* (2013.01); *A61K 31/352* (2013.01); *A61K 31/353* (2013.01); *A61K 31/355* (2013.01); *A61K 36/185* (2013.01); *A61K 45/06* (2013.01); *A61K 47/22* (2013.01)

(58) Field of Classification Search
CPC ........................... A61K 31/335; A61K 31/355
USPC .................................................. 514/454, 458
See application file for complete search history.

(56) References Cited

U.S. PATENT DOCUMENTS

| 4,837,228 | A | 6/1989 | Elsohly et al. |
| 5,891,469 | A | 4/1999 | Amselem |
| 6,982,282 | B2 | 1/2006 | Elsohly et al. |
| 7,923,026 | B2 | 4/2011 | Moschwitzer |
| 8,790,719 | B2 | 7/2014 | Parolaro et al. |
| 10,568,865 | B2 | 2/2020 | Levy |
| 10,722,490 | B2 | 7/2020 | Levy |
| 2003/0101902 | A1 | 6/2003 | Reitnauer et al. |
| 2006/0257463 | A1 | 11/2006 | Elsohly et al. |
| 2008/0193725 | A1 | 8/2008 | Saint-Romain |
| 2009/0098192 | A1 | 4/2009 | Fuisz |
| 2009/0133704 | A1 | 5/2009 | Strickland et al. |
| 2010/0298579 | A1 | 11/2010 | Steup et al. |
| 2011/0052694 | A1 | 3/2011 | Stinchcomb et al. |
| 2011/0306660 | A1 | 12/2011 | Goskonda et al. |
| 2012/0004251 | A1 | 1/2012 | Whalley et al. |
| 2013/0059018 | A1 | 3/2013 | Parolaro et al. |
| 2013/0276779 | A1 | 10/2013 | Hale et al. |
| 2014/0100269 | A1 | 4/2014 | Goskonda et al. |
| 2014/0221469 | A1 | 8/2014 | Ross et al. |
| 2014/0243405 | A1 | 8/2014 | Whalley et al. |
| 2014/0271940 | A1 | 9/2014 | Wurzer et al. |

(Continued)

FOREIGN PATENT DOCUMENTS

| CA | 2684562 | 10/2008 |
| CA | 3030535 | 1/2018 |

(Continued)

OTHER PUBLICATIONS

Office Action dated Nov. 22, 2022, for EP App No. 17847412.8, 4 pgs.

Ansel et al., "Pharmaceutical Dosage Forms and Drug Delivery Systems, 7th Edition," Lippincott, Williams, & Wilkins, 1999, pp. 48-53.

Chen, "Some of the Parts: Is Marijuana's 'Entourage Effect' Scientifically Valid?" Scientific American, Apr. 20, 2017, retrieved from www.scientificamerican.com/article/some-of-the-parts-is-marijuana-rsquo-s-ldquo-entourage-effect-rdquo-sci 3 pages.

(Continued)

*Primary Examiner* — Raymond J Henley, III
(74) *Attorney, Agent, or Firm* — McCarthy Tétrault LLP

(57) ABSTRACT

This disclosures relates to new compositions and methods for making cannabinoid formulations. In one embodiment, this disclosure provides water soluble compositions comprising a first purified cannabinoid and Vitamin E TPGS. In one embodiment, the disclosure herein comprises a method of making powders comprising heating material to a first temperature and a second temperature.

23 Claims, No Drawings

(56) References Cited

U.S. PATENT DOCUMENTS

| | | |
|---|---|---|
| 2014/0356420 A1 | 12/2014 | Huang |
| 2015/0064250 A1 | 3/2015 | Ghebre-Sellassie et al. |
| 2015/0126595 A1 | 5/2015 | Smith et al. |
| 2015/0258040 A1 | 9/2015 | Lynch et al. |
| 2015/0297556 A1 | 10/2015 | Smith |
| 2016/0029658 A1 | 2/2016 | Segawa et al. |
| 2016/0081976 A1 | 3/2016 | Bromley |
| 2016/0250270 A1 | 9/2016 | Cooper et al. |
| 2016/0256395 A1 | 9/2016 | De Bries et al. |
| 2016/0279073 A1 | 9/2016 | Donsky et al. |
| 2017/0049754 A1 | 2/2017 | Diederich et al. |
| 2017/0266153 A1 | 9/2017 | Levy et al. |
| 2019/0030101 A1 | 1/2019 | Cooper et al. |
| 2019/0090527 A1 | 3/2019 | Levy |
| 2019/0183853 A1 | 6/2019 | Levy |
| 2019/0388384 A1 | 12/2019 | Segal et al. |
| 2020/0000766 A1 | 1/2020 | Reid et al. |
| 2020/0121637 A1 | 4/2020 | Levy |

FOREIGN PATENT DOCUMENTS

| | | |
|---|---|---|
| CN | 100482657 | 7/2005 |
| CN | 102869356 | 1/2013 |
| CN | 103826621 | 5/2014 |
| GB | 2495118 | 4/2013 |
| WO | WO 2008024408 | 2/2008 |
| WO | WO 2011135591 | 11/2011 |
| WO | WO 2014100231 | 6/2014 |
| WO | WO 2014159688 | 10/2014 |
| WO | WO 2015068052 | 5/2015 |
| WO | WO 2015200049 | 12/2015 |
| WO | WO 2016109624 | 7/2016 |
| WO | WO 2018011808 | 1/2018 |

OTHER PUBLICATIONS

Extended European Search Report for European Patent Application No. 1784 7 412.8, dated May 26, 2020, 7 pages.

Haibo et al., "Research Progress on Chemical ingredient and Pharmacological activity of Fructus Cannabis," Chinese Journal of Ethnomedicine and Ethnophamacy, vol. 19, No. 8, 2010, pp. 56-57.

International Search Report and Written Opinion for International (PCT) Application No. PCT/US2017/049219, dated Nov. 3, 2017, 7 pages.

Izzo et al., "Inhibitory effect of cannabichromene, a major non-psychotropic cannabinoid extracted from *Cannabis sativa*, on inflammation-induced hypermotility in mice, " British Journal of Pharmacology, vol. 166, 2012, pp. 1444-1460.

Klauke et al., "The cannabinoid CB2 receptor-selective phytocannabinoid beta-cryophyllene exerts analgesic effects in mouse models of inflammatory and neuropathic pain," European Neuropsychopharmacoloav, vol. 24. 2014. pp. 608-620.

Maione et al., "Non-psychoactive cannabinoids modulate the descending pathway of antinociception in anaesthetized rats through several mechanisms of action," British Journal of Pharmacoloav. vol. 162. 2011. pp. 584-596.

Marriot et al., "Pharmaceutical Compounding and Dispensing, 2nd Edition, " Pharmaceutical Press, 2010, 305 pages.

Mcpartland et al., "Cannabis and Cannabis Extracts: Greater than the Sum of Their Parts?," The Haworth Press, Inc., 2001, pp. 103-132.

Mcpartland et al., "Side Effects of Pharmaceuticals Not Elicited by the Comparable Herbal Medicines: The Case of Tetrahydrocannabinol and Marijuana," Alternative Therapies in Health and Medicine, vol. 5, No. 4, Jul. 1999, pp. 57-62.

Mosely, "Ebbu Announces Groundbreaking Production Scale Purification Process," Business Wire, Jun. 13, 2016, retrieved from www.businesswire.com/news/home/20160613006490/en/Ebbu-Announces-Groundbreaking-Production-Scal 2 pages.

Omar et al., "Optimisation and characterisation of marihuana extracts obtained by supercritical fluid extraction and focused ultrasound extraction and retention time locking GC-MS," Journal of Separate Science, vol. 36, 2013, pp. 1397-1404.

Ross et al., "The Volatile Oil Composition of Fresh and Air-Dried Buds of *Cannabis sativa*," Journal of Natural Products, vol. 59, No. 1, Jan. 1996, pp. 49-51.

Russo et al., "Taming THC: potential cannabis synergy and phytocannabinoid-terpenoid entouraae effects," British Journal of Pharmacoloav, vol. 163, 2011, DD. 1344-1364.

Tomic et al., "Antihyperalgesic and Antiedematous Activities of Bisabolol-Oxides-Rich Matricaria Oil in a Rat Model of Inflammation," Phytotheraov Research, vol. 28, 2014, pp. 759-766.

Non-Final Office Action dated Jan. 28, 2020 in U.S. Appl. No. 16/700,678.

Non-Final Office Action dated May 14, 2019 in U.S. Appl. No. 16/328,833.

Non-Final Office Action dated Jun. 8, 2020 U.S. Appl. No. 16/860,589.

Notice of Allowance dated Jan. 27, 2020 in U.S. Appl. No. 16/328,833.

Notice of Allowance dated Apr. 24, 2020 in U.S. Appl. No. 16/700,678.

Notice of Allowance dated Sep. 16, 2020 U.S. Appl. No. 16/860,589.

Wirth et al., "Anti-Inflammatory Properties of Cannabichromene," Life Sciences, vol. 26, No. 23, 1980, 5 pages.

Wright et al., "Cannabinoid CB2 receptors in the gastrointestinal tract: a regulatory system in states of inflammation," British Journal of Pharmacoloi:iv, vol. 153, 2008, pp. 263-270.

WATER SOLUBLE COMPOSITIONS COMPRISING PURIFIED CANNABINOIDS

CROSS-REFERENCE TO RELATED APPLICATIONS

This application is a continuation-in-part of U.S. patent application Ser. No. 17/352,032, filed Jun. 18, 2021, entitled "WATER SOLUBLE COMPOSITIONS COMPRISING PURIFIED CANNABINOIDS," which is a continuation of U.S. patent application Ser. No. 17/024,601, filed Sep. 17, 2020 entitled "WATER SOLUBLE COMPOSITIONS COMPRISING PURIFIED CANNABINOIDS," which is a continuation of U.S. patent application Ser. No. 16/860,589, filed Apr. 28, 2020 entitled "WATER SOLUBLE COMPOSITIONS COMPRISING PURIFIED CANNABINOIDS," which is a continuation of U.S. patent application Ser. No. 16/700,678, filed Dec. 2, 2019, now U.S. Pat. No. 10,722,490 entitled, "WATER SOLUBLE COMPOSITIONS COMPRISING PURIFIED CANNABINOIDS," which is a continuation of U.S. patent application Ser. No. 16/328,833 filed Feb. 27, 2019, now U.S. Pat. No. 10,568,865, entitled "WATER SOLUBLE COMPOSITIONS COMPRISING PURIFIED CANNABINOIDS," which is a U.S. national stage entry under 35 U.S.C. § 371 of International Application No. PCT/US2017/049219 filed Aug. 29, 2017 entitled "WATER SOLUBLE COMPOSITIONS COMPRISING PURIFIED CANNABINOIDS," which claims priority to, and the benefit of, U.S. Provisional Patent Application Ser. No. 62/380,954, filed on Aug. 29, 2016, the entire disclosures of each of which are incorporated herein by reference in their entirety.

TECHNICAL FIELD

This disclosure relates to the cannabis industry. In particular, this disclosure relates to water soluble cannabinoid formulations, including methods for creating said water soluble cannabinoid formulations.

BACKGROUND

The word "cannabis" refers to a genus of flowering plants. Plants of genus *Cannabis* include several species, including *Cannabis sativa, Cannabis indica*, and *Cannabis ruderalis*. There is a long history of cultivating plants of genus cannabis for hemp fibers, seeds and seed oils, medicinal purposes, and recreational activities.

According to some accounts, *Cannabis* is composed of at least 483 known chemical compounds, which include cannabinoids, terpenoids, flavonoids, nitrogenous compounds, amino acids, proteins, glycoproteins, enzymes, sugars and related compounds, hydrocarbons, alcohols, aldehydes, ketones, acids, fatty acids, esters, lactones, steroids, terpenes, non-cannabinoid phenols, vitamins, and pigments.

Cannabinoids are of particular interest for research and commercialization. Most extractions of cannabis plant matter aim to extract cannabinoids, particularly tetrahydrocannabinol (THC). THC is useful for relieving pain, treating glaucoma, and relieving nausea. THC is also gaining immense popularity as a recreational drug substance. Usually, cannabinoids are extracted from the cannabis plant as part of a crude mixture, combined with other chemical compounds found in the cannabis plant.

Current methods of administration cannabinoids fail to take full advantage of cannabinoid properties. For example, burning plant matter and inhaling the vapor does not allow for selection of certain cannabinoids for their certain desired benefit. One can choose a plant with certain known properties, e.g., THC content, but there is still little to no control over selecting individual cannabinoids. Inhaling smoke also leads to many harmful and toxic compounds introduced into the body.

There exists a need for new cannabinoid formulations. In particular, there exists a need for water soluble cannabinoid formulations. Additionally, there exists a need for methods for producing aqueous cannabinoid formulations. Furthermore, there exists a need for making formulations with increased permeability into the bloodstream. Also, there also exists a need for cannabis formulations which provide increased bioavailability of cannabinoids.

DETAILED DESCRIPTION

Unless defined otherwise, all technical and scientific terms used herein have the same meaning as commonly understood by one of ordinary skill in the art to which the disclosure belongs. Although any methods and materials similar to or equivalent to those described herein can be used in the practice or testing of the present disclosure, suitable methods and materials are described below.

Disclosed herein are new cannabinoid formulations, including water soluble cannabinoid formulations. In one embodiment, the formulations disclosed herein are used for creating other new formulations. In one embodiment, the formulations disclosed herein are soluble in other liquids, e.g., aqueous liquids such as juices, soft drinks, wine, cocktails, medicinal preparations, coffee, tea, etc. The formulations are suitably in a nontoxic consumable liquid form or a dispersible powder form. The formulations may also be absorbed, sprayed or otherwise applied into or onto a solid material (e.g. a tea bag). Suitably, embodiments of the formulations disclosed herein provide stability, solubility in water, have minimal flavour and odor, are calorie-free, and are natural in origin. In some embodiments, the formulations can contain flavour, odor, and/or calories if desired, particularly when comprised in or used for the preparation of a beverage or foodstuff, including for example a sports drink beverage.

Disclosed herein are methods of making formulations with increased permeability into the bloodstream. Also disclosed herein are cannabis formulations, which provide increased bioavailability of cannabinoids.

Disclosed herein is a new composition comprising a first purified cannabinoid and Vitamin E TPGS.

As used herein, the term "purified" means extracted, isolated, and/or separated from other compounds, formulations, compositions, matter, and/or mass. In one embodiment, the term "purified" refers to a cannabinoid that is separated from the plant matter from which it was derived.

In one embodiment, the term "purified" refers to a cannabinoid (a "purified cannabinoid") that is separated from other cannabinoids that were present in the plant matter from which it was derived. In one embodiment, the term "purified" refers to a cannabinoid (a "purified cannabinoid") that is separated from terpenes that were present in the plant matter from which it was derived. In one embodiment, the term "purified" refers to a cannabinoid (a "purified cannabinoid") that is separated from secondary compounds that were present in the plant matter from which it was derived. In one embodiment, the term "purified" refers to a cannabinoid (a "purified cannabinoid") that is separated from all material that was present in the plant matter from which it was derived.

In one embodiment, the term "purified" refers to a terpene (a "purified terpene") that is separated from other cannabinoids that were present in the plant matter from which it was derived. In one embodiment, the term "purified" refers to a terpene (a "purified terpene") that is separated from terpenes that were present in the plant matter from which it was derived. In one embodiment, the term "purified" refers to a terpene (a "purified terpene") that is separated from secondary compounds that were present in the plant matter from which it was derived. In one embodiment, the term "purified" refers to a terpene (a "purified terpene") that is separated from all material that was present in the plant matter from which it was derived.

Within the context of this disclosure, purified compounds may be purposely formulated with other compounds at various levels of purity. For example, depending on the desired outcome, a particular cannabinoid and/or terpene may be formulated with other molecules when it is 60-65% pure, 65-70% pure, 70-75% pure, 75-80% pure, 80-85% pure, 85-90% pure, 90-95% pure, 95-99% pure, 99-99.9% pure, 99.9+%, or greater than 99% pure. Provided that the ingredients used for purposeful formulation are purified prior to the said purposeful formulation, the act of subsequently formulating them does render them not "purified" within the context of an ingredient list.

As used herein, the term "cannabinoid" refers to a compound belonging to a class of secondary compounds commonly found in plants of genus cannabis. In one embodiment, the cannabinoid is found in a plant, e.g., a plant of genus cannabis, and is sometimes referred to as a phytocannabinoid. In one embodiment, the cannabinoid is found in a mammal, sometimes called an endocannabinoid. In one embodiment, the cannabinoid is made in a laboratory setting, sometimes called a synthetic cannabinoid. In one embodiment, the cannabinoid acts upon a cellular receptor, such as a G-coupled protein receptor (e.g., a serotonin receptor, a cannabinoid receptor, TRPV1, an opioid receptor, etc.) thereby causing a response on the brain or body. In one embodiment, the cannabinoid affects the activity of other compounds at one or more receptors by acting as an agonist, partial agonist, inverse agonist, antagonist, etc.

In many cases, a cannabinoid can be identified because its chemical name will include the text string "*cannabi* in the name.

Within the context of this application, where reference is made to a particular cannabinoid, each of the acid and/or decarboxylated forms are contemplated as both single molecules and mixtures.

Examples of cannabinoids include, but are not limited to, Cannabigerolic Acid (CBGA), Cannabigerolic Acid monomethylether (CBGAM), Cannabigerol (CBG), Cannabigerol monomethylether (CBGM), Cannabigerovarinic Acid (CBGVA), Cannabigerovarin (CBGV), Cannabichromenic Acid (CBCA), Cannabichromene (CBC), Cannabichromevarinic Acid (CBCVA), Cannabichromevarin (CBCV), Cannabidiolic Acid (CBDA), Cannabidiol (CBD), Cannabidiol monomethylether (CBDM), Cannabidiol-$C_4$ (CBD-$C_4$), Cannabidivarinic Acid (CBDVA), Cannabidivarin (CBDV), Cannabidiorcol (CBD-$C_1$), Tetrahydrocannabinolic acid A (THCA-A), Tetrahydrocannabinolic acid B (THCA-B), Tetrahydrocannabinolic Acid (THCA), Tetrahydrocannabinol (THC), Tetrahydrocannabinolic acid $C_4$ (THCA-$C_4$), Tetrahydrocannbinol $C_4$ (THC-$C_4$), Tetrahydrocannabivarinic acid (THCVA), Tetrahydrocannabivarin (THCV), Tetrahydrocannabiorcolic acid (THCA-$C_1$), Tetrahydrocannabiorcol (THC-$C_1$), $\Delta^7$-cis-iso-tetrahydrocannabivarin, $\Delta^8$-tetrahydrocannabinalic acid ($\Delta$8-THCA), Cannabivarinodiolic (CBNDVA), Cannabivarinodiol (CBNDV), $\Delta^8$-tetrahydrocannabinol ($\Delta^8$-THC), tetrahydrocannabinol ($\Delta^9$-THC), Cannabicyclolic acid (CBLA), Cannabicyclol (CBL), Cannabicyclovarin (CBLV), Cannabielsoic acid A (CBEA-A), Cannabielsoic acid B (CBEA-B), Cannabielsoin (CBE), Cannabivarinselsoin (CBEV), Cannabivarinselsoinic Acid (CBEVA), Cannabielsoic Acid (CBEA), Cannabielvarinsoin (CBLV), Cannabielvarinsoinic Acid (CBLVA), Cannabinolic acid (CBNA), Cannabinol (CBN), Cannabivarinic Acid (CBNVA), Cannabinol methylether (CBNM), Cannabinol-$C_4$ (CBN-$C_4$), Cannabivarin (CBV), Cannabino-$C_2$ (CBN-$C_2$), Cannabiorcol (CBN-$C_1$), Cannabinodiol (CBND), Cannabinodiolic Acid (CBNDA), Cannabinodivarin (CBDV), Cannabitriol (CBT), 10-Ethoxy-9-hydroxy-$\Delta^{6a}$-tetrahydrocannabinol, 8,9-Dihydroxy-$\Delta^{6a(10a)}$-tetrahydrocannabinol (8,9-Di-OH-CBT-$C_5$), Cannabitriolvarin (CBTV), Ethoxy-cannabitriolvarin (CBTVE), Dehydrocannabifuran (DCBF), Cannbifuran (CBF), Cannabichromanon (CBCN), Cannabicitran (CBT), 10-Oxo-$\Delta^{6a(10a)}$-tetrahydrocannabinol (OTHC), $\Delta^9$-cis-tetrahydrocannabinol (cis-THC), Cannabiripsol (CBR), 3,4,5,6-tetrahydro-7-hydroxy-alpha-alpha-2-trimethyl-9-n-propyl-2,6-methano-2H-1-benzoxocin-5-methanol (OH-iso-HHCV), Trihydroxy-delta-9-tetrahydrocannabinol (triOH-THC), Yangonin, Epigallocatechin gallate, Dodeca-2E, 4E, 8Z, 10Z-tetraenoic acid isobutylamide, and Dodeca-2E,4E-dienoic acid isobutylamide.

In one embodiment, the first purified cannabinoid is chosen from THC, D9-THC, D8-THC, THCA, THCV, D8-THCV, D9-THCV, THCVA, CBD, CBDA, CBDV, CBDVA, CBC, CBCA, CBCV, CBCVA, CBG, CBGA, CBGV, CBGVA, CBN, CBNA, CBNV, CBNVA, CBND, CBNDA, CBNDV, CBNDVA, CBE, CBEA, CBEV, CBEVA, CBL, CBLA, CBLV, or CBLVA.

As used herein, the term "THC" refers to tetrahydrocannabinol and has the following structural formula:

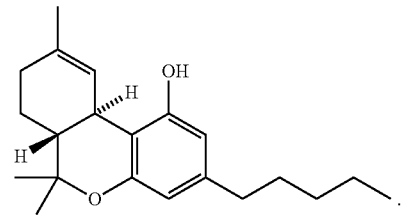 [SMILES: CCCCCc1cc(O)c2c(c1)OC(C)(C)[C@@H]1CCC(C)=C[C@@H]21]

Within the context of this disclosure, compositions comprising THC are formulated with other compounds, thereby providing previously unavailable aqueous formulations.

As used herein, the term "THCA" refers to tetrahydrocannabinolic acid and has the following structural formula:

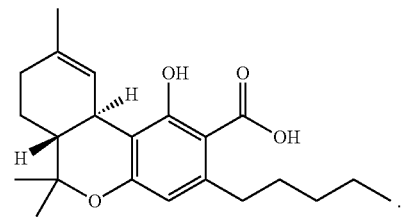 [SMILES: CCCCCc1cc2c(c(O)c1C(=O)O)[C@@H]1C=C(C)CC[C@H]1C(C)(C)O2]

Decarboxylating THCA with heat, light, etc., forms THC, D8-THC, D9-THC, and other potential cannabinoids. Within the context of this disclosure, compositions comprising THCA are formulated with other compounds, thereby providing previously unavailable aqueous formulations.

As used herein, the term "THCV" refers to tetrahydrocannabivarin and has the following structural formula:

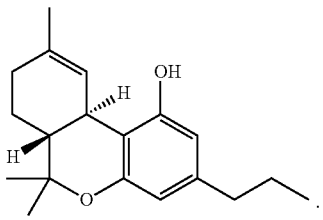 [SMILES: CCCc1cc(O)c2c(c1)OC(C)(C)[C@@H]1CCC(C)=C[C@@H]21]

Within the context of this disclosure, compositions comprising THCV are formulated with other compounds, thereby providing previously unavailable aqueous formulations.

As used herein, the term "THCVA" refers to tetrahydrocannabivarinic acid and has the following structural formula:

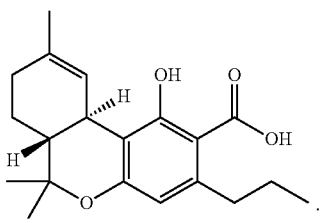 [SMILES: CCCc1cc2c(c(O)c1C(=O)O)[C@@H]1C=C(C)CC[C@H]1C(C)(C)O2]

Decarboxylating THCVA with heat, light, etc., forms THCV, D8-THCV, D9-THCV, and other possible cannabinoid derivatives. Within the context of this disclosure, compositions comprising THCVA are formulated with other compounds, thereby providing previously unavailable aqueous formulations.

As used herein, the term "D8-THC" refers to delta-8-tetrahydrocannabinol and has the following structural formula:

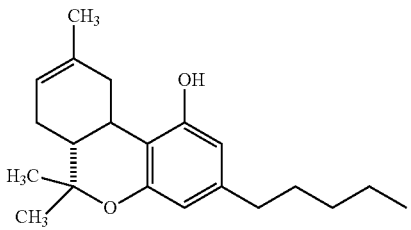

Within the context of this disclosure, compositions comprising D8-THC are formulated with other compounds, thereby providing previously unavailable aqueous formulations.

As used herein, the term "D8-THCV" refers to delta-8-tetrahydrocannabivarin and has the following structural formula:

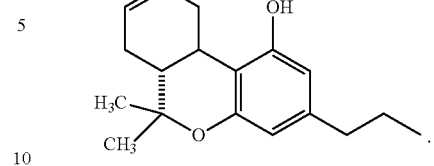

Within the context of this disclosure, compositions comprising D8-THCV are formulated with other compounds, thereby providing previously unavailable aqueous formulations.

As used herein, the term "D9-THC" refers to delta-9-tetrahydrocannabinol and has the following structural formula:

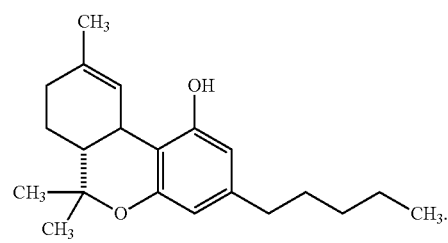

Within the context of this disclosure, compositions comprising D9-THC are formulated with other compounds, thereby providing previously unavailable aqueous formulations.

As used herein, the term "D9-THCV" refers to delta-9-tetrahydrocannabivarin and has the following structural formula:

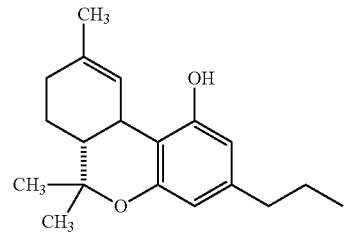

Within the context of this disclosure, compositions comprising D9-THCV are formulated with other compounds, thereby providing previously unavailable aqueous formulations.

As used herein, the term "CBD" refers to cannabidiol and has the following structural formula:

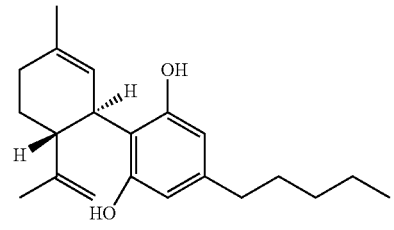

Within the context of this disclosure, compositions comprising CBD are formulated with other compounds, thereby providing previously unavailable aqueous formulations.

As used herein, the term "CBDA" refers to cannabidiolic acid and has the following structural formula:

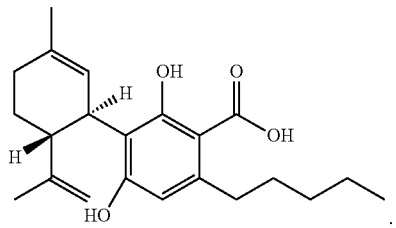 [SMILES: C=C(C)[C@@H]1CCC(C)=C[C@H]1c1c(O)cc(CCCCC)c(C(=O)O)c1O]

Decarboxylating CBDA with heat, light, etc., forms CBD and other possible cannabinoid derivatives. Within the context of this disclosure, compositions comprising CBDA are formulated with other compounds, thereby providing previously unavailable aqueous formulations.

As used herein, the term "CBDV" refers to cannabidivarin and has the following structural formula:

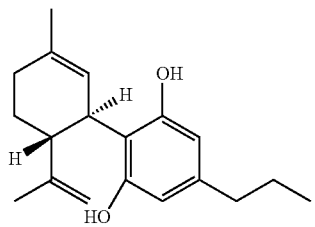

Within the context of this disclosure, compositions comprising CBDV are formulated with other compounds, thereby providing previously unavailable aqueous formulations.

As used herein, the term "CBDVA" refers to cannabidivarinic acid and has the following structural formula:

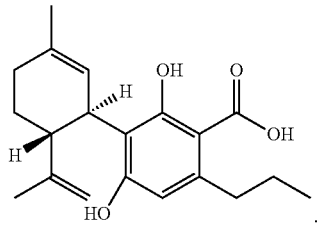 [SMILES: C=C(C)[C@@H]1CCC(C)=C[C@H]1c1c(O)cc(CCC)c(C(=O)O)c1O]

Decarboxylating CBDVA with heat, light, etc., forms CBDV and other possible cannabinoid derivatives. Within the context of this disclosure, compositions comprising CBDVA are formulated with other compounds, thereby providing previously unavailable aqueous formulations.

As used herein, the term "CBC" refers to cannabichromene and has the following structural formula:

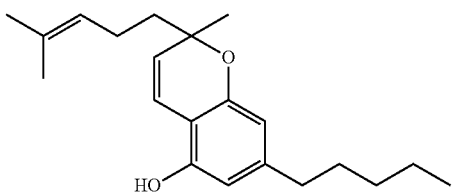

Within the context of this disclosure, compositions comprising CBC are formulated with other compounds, thereby providing previously unavailable aqueous formulations.

As used herein, the term "CBCA" refers to cannabichromenic acid and has the following structural formula:

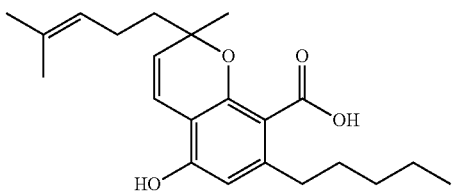

Decarboxylating CBCA with heat, light, etc., forms CBC and other possible cannabinoid derivatives. Within the context of this disclosure, compositions comprising CBCA are formulated with other compounds, thereby providing previously unavailable aqueous formulations.

As used herein, the term "CBCV" refers to cannabichromevarin and has the following structural formula:

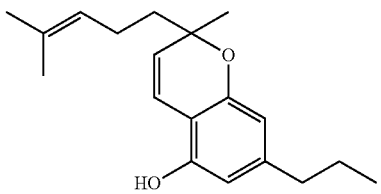

Within the context of this disclosure, compositions comprising CBCV are formulated with other compounds, thereby providing previously unavailable aqueous formulations.

As used herein, the term "CBCVA" refers to cannabichromevarinic acid and has the following structural formula:

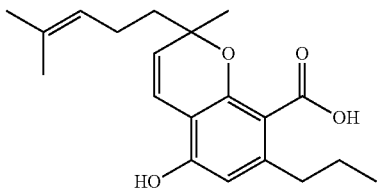

Decarboxylating CBCVA with heat, light, etc., forms CBCV and other possible cannabinoid derivatives. Within the context of this disclosure, compositions comprising CBCVA are formulated with other compounds, thereby providing previously unavailable aqueous formulations.

As used herein, the term "CBG" refers to cannabigerol and has the following structural formula:

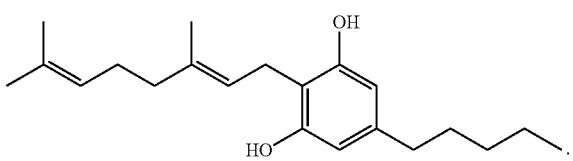 [SMILES: CCCCCc1cc(O)c(C/C=C(\C)CCC=C(C)C)c(O)c1]

Within the context of this disclosure, compositions comprising CBG are formulated with other compounds, thereby providing previously unavailable aqueous formulations.

As used herein, the term "CBGA" refers to cannabigerolic acid and has the following structural formula:

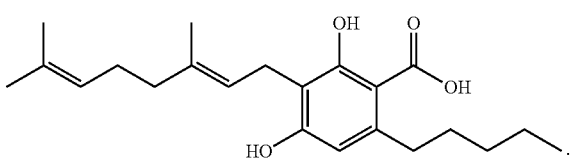 [SMILES: CCCCCc1cc(O)c(C/C=C(\C)CCC=C(C)C)c(O)c1C(=O)O]

Decarboxylating CBGA with heat, light, etc., forms CBG and other possible cannabinoid derivatives. Within the context of this disclosure, compositions comprising CBGA are formulated with other compounds, thereby providing previously unavailable aqueous formulations.

As used herein, the term "CBGV" refers to cannabigerovarin and has the following structural formula:

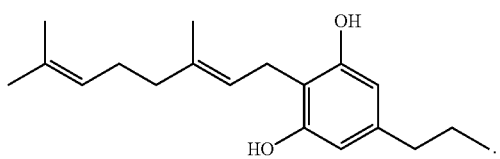 [SMILES: CCCc1cc(O)c(C/C=C(\C)CCC=C(C)C)c(O)c1]

Within the context of this disclosure, compositions comprising CBGV are formulated with other compounds, thereby providing previously unavailable aqueous formulations.

As used herein, the term "CBGVA" refers to cannabigerovarinic acid and has the following structural formula:

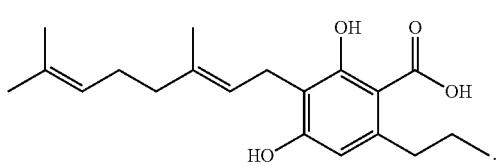 [SMILES: CCCc1cc(O)c(C/C=C(\C)CCC=C(C)C)c(O)c1C(=O)O]

Decarboxylating CBGVA with heat, light, etc., forms CBGV and other possible cannabinoid derivatives. Within the context of this disclosure, compositions comprising CBGVA are formulated with other compounds, thereby providing previously unavailable aqueous formulations.

As used herein, the term "CBN" refers to cannabinol and has the following structural formula:

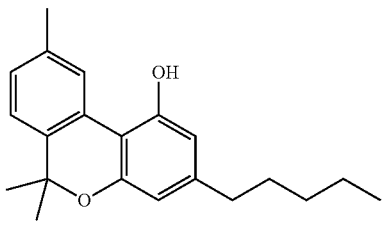

Within the context of this disclosure, compositions comprising CBN are formulated with other compounds, thereby providing previously unavailable aqueous formulations.

As used herein, the term "CBNA" refers to cannabinolic acid and has the following structural formula:

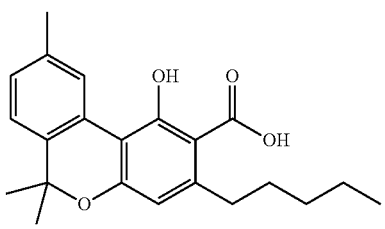

Decarboxylating CBNA with heat, light, etc., forms CBN and other possible cannabinoid derivatives. Within the context of this disclosure, compositions comprising CBNA are formulated with other compounds, thereby providing previously unavailable aqueous formulations.

As used herein, the term "CBNV" or "CBV" refers to cannabivarin and has the following structural formula:

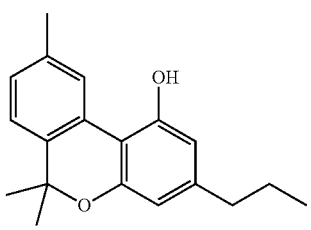

Within the context of this disclosure, compositions comprising CBNV are formulated with other compounds, thereby providing previously unavailable aqueous formulations.

As used herein, the term "CBNVA" refers to cannabivarinic acid and has the following structural formula:

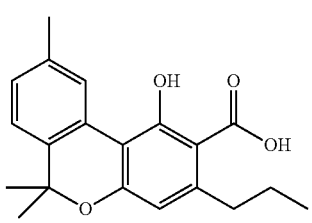

Decarboxylating CBNVA with heat, light, etc., forms CBNV and other possible cannabinoid derivatives. Within the context of this disclosure, compositions comprising CBNVA are formulated with other compounds, thereby providing previously unavailable aqueous formulations.

As used herein, the term "CBND" refers to cannabinodiol and has the following structural formula:

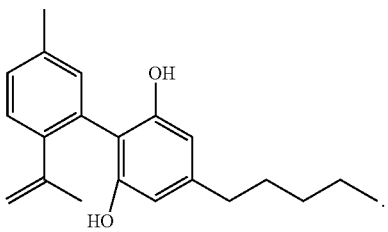 [SMILES: C=C(C)c1ccc(C)cc1-c1c(O)cc(CCCCC)cc1O]

Within the context of this disclosure, compositions comprising CBND are formulated with other compounds, thereby providing previously unavailable aqueous formulations.

As used herein, the term "CBNDA" refers to cannabinodiolic acid and has the following structural formula:

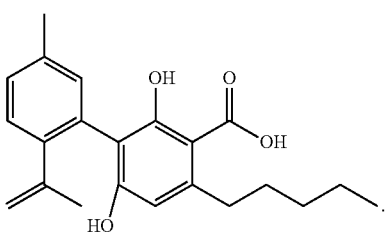 [SMILES: C=C(C)c1ccc(C)cc1-c1c(O)cc(CCCCC)c(C(=O)O)c1O]

Decarboxylating CBNDA with heat, light, etc., forms CBND and other possible cannabinoid derivatives. Within the context of this disclosure, compositions comprising CBNDA are formulated with other compounds, thereby providing previously unavailable aqueous formulations.

As used herein, the term "CBNDV" refers to cannabivarinodiol and has the following structural formula:

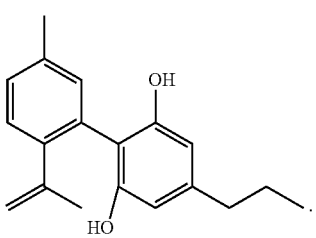 [SMILES: C=C(C)c1ccc(C)cc1-c1c(O)cc(CCC)cc1O]

Within the context of this disclosure, compositions comprising CBNDV are formulated with other compounds, thereby providing previously unavailable aqueous formulations.

As used herein, the term "CBNDVA" refers to cannabivarinodiolic acid and has the following structural formula:

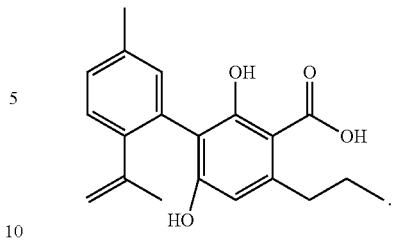

Decarboxylating CBNDVA with heat, light, etc., forms CBNDV and other possible cannabinoid derivatives. Within the context of this disclosure, compositions comprising CBNDVA are formulated with other compounds, thereby providing previously unavailable aqueous formulations.

As used herein, the term "CBL" refers to cannabicyclol and has the following structural formula:

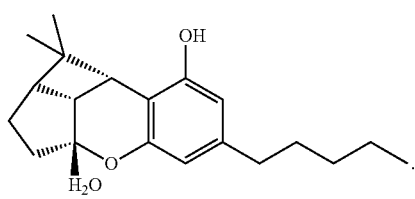

Within the context of this disclosure, compositions comprising CBL are formulated with other compounds, thereby providing previously unavailable aqueous formulations.

As used herein, the term "CBLA" refers to cannabicyclolic acid and has the following structural formula:

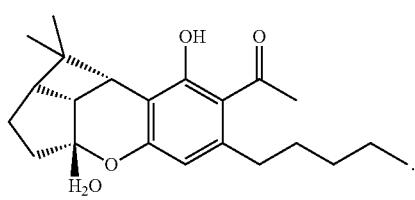

Decarboxylating CBLA with heat, light, etc., forms CBL and other possible cannabinoid derivatives. Within the context of this disclosure, compositions comprising CBLA are formulated with other compounds, thereby providing previously unavailable aqueous formulations.

As used herein, the term "CBLV" refers to cannabicyclovarin and has the following structural formula:

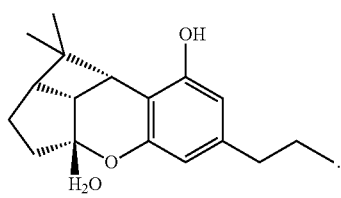

Within the context of this disclosure, compositions comprising CBLV are formulated with other compounds, thereby providing previously unavailable aqueous formulations.

As used herein, the term "CBLVA" refers to cannabielvarinsoinic acid and has the following structural formula:

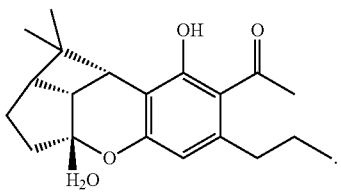

Decarboxylating CBLVA with heat, light, etc., forms CBLV and other possible cannabinoid derivatives. Within the context of this disclosure, compositions comprising CBLVA are formulated with other compounds, thereby providing previously unavailable aqueous formulations.

As used herein, the term "CBE" refers to cannabielsoin and has the following structural formula:

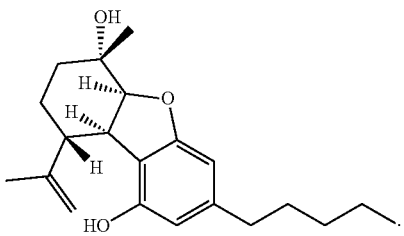

Within the context of this disclosure, compositions comprising CBE are formulated with other compounds, thereby providing previously unavailable aqueous formulations.

As used herein, the term "CBEA" refers to cannabielsoic acid and has the following structural formula:

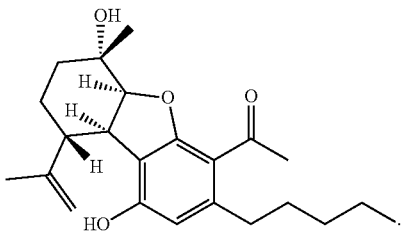

Decarboxylating CBEA with heat, light, etc., forms CBE and other possible cannabinoid derivatives. Within the context of this disclosure, compositions comprising CBEA are formulated with other compounds, thereby providing previously unavailable aqueous formulations.

As used herein, the term "CBEV" refers to cannabivarinselsoin and has the following structural formula:

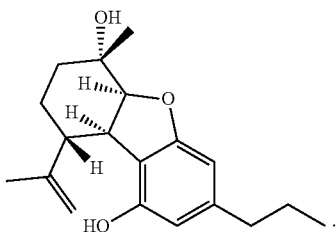

Within the context of this disclosure, compositions comprising CBEV are formulated with other compounds, thereby providing previously unavailable aqueous formulations.

As used herein, the term "CBEVA" refers to cannabivarinselsoinic acid and has the following structural formula:

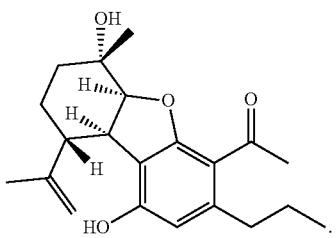

Decarboxylating CBEVA with heat, light, etc., forms CBEV and other possible cannabinoid derivatives. Within the context of this disclosure, compositions comprising CBEVA are formulated with other compounds, thereby providing previously unavailable aqueous formulations.

As used herein, the terms "Vitamin E TPGS" and "TPGS" are used interchangeably and refer to the esterification of Vitamin E succinate with polyethylene glycol resulting in the following structural formula:

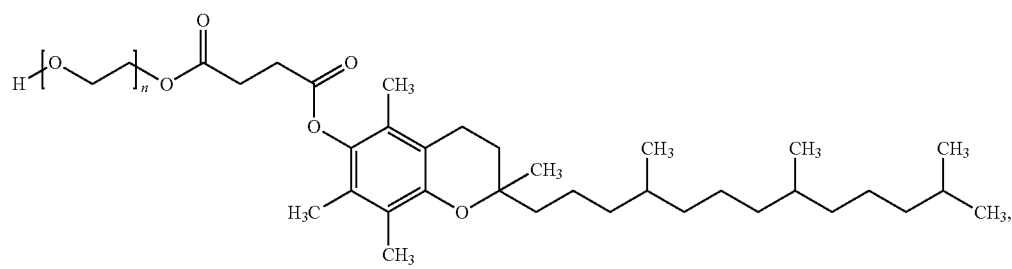

where "n" is an integer.

Examples of Vitamin E TPGS include, but are not limited to Vitamin E TPGS 200, Vitamin E TPGS 300, Vitamin E TPGS 400, Vitamin E TPGS 1000, Vitamin E TPGS 1500, Vitamin E TPGS 2000, and Vitamin E TPGS 4000.

Within the context of this disclosure, Vitamin E TPGS is formulated with a compound or compounds found in a plant of genus cannabis to increase the solubility and bioavailability of poorly water soluble lipophilic compounds.

In one embodiment, the compositions disclosed herein comprise a ratio of Vitamin E TPGS to the first purified cannabinoid of about 90:10 to about 70:30 by percent mass. In one embodiment, the compositions disclosed herein comprise a ratio of Vitamin E TPGS to the first purified cannabinoid of about 85:15 to about 75:25 by percent mass. In one embodiment, the compositions disclosed herein comprise a ratio of Vitamin E TPGS to the first purified cannabinoid of about 82:18 to about 78:22 by percent mass. In one embodiment, the compositions disclosed herein comprise a ratio of Vitamin E TPGS to the first purified cannabinoid of about 80:20 to about 70:30 by percent mass. In one embodiment, the compositions disclosed herein comprise a ratio of Vitamin E TPGS to the first purified cannabinoid of about 90:10 to about 80:20 by percent mass. As used herein, the term "percent mass" refers to the amount of matter of a compound expressed as a fraction of 100. In one embodiment, the percent mass is expressed in grams. In one embodiment, the percent mass is expressed in ounces. In one embodiment, the percent mass is expressed in moles. In one embodiment, the percent mass is the amount of a first purified cannabinoid in a composition. In one embodiment, the percent is the amount of Vitamin E TPGS in a composition. In one embodiment, the percent mass is calculated with the following formula:

mass of compound÷total mass of sample×100

For example:

5.0 g THC÷100 g sample×100=5%

As used herein, the term "ratio" refers to the relative amount of one or more compounds in relation to another compound or compounds. In one embodiment, the ratio is in reference to the mass of one compound to another. In one embodiment, the ratio is in reference to the mass percent of one compound to another. In one embodiment, the ratio is in reference to the dry weight of one compound to another. In one embodiment, the ratio is in reference to the volume of one compound to another. In one embodiment, the ratio is in reference to the molar mass of one compound to another.

In one embodiment, the ratio is the amount of a first purified cannabinoid to the amount of Vitamin E TPGS. In one embodiment, the ratio is the amount of a first purified cannabinoid and a second purified cannabinoid to the amount of Vitamin E TPGS. In one embodiment, the ratio is the amount of a first purified cannabinoid and a second purified cannabinoid to the amount of Vitamin E TPGS.

In one embodiment, the ratio of the first purified cannabinoid to Vitamin E TPGS is about 1:1 to 1:10. In one embodiment, the ratio of the first purified cannabinoid to Vitamin E TPGS is about 1:1 to 1:8. In one embodiment, the ratio of the first purified cannabinoid to Vitamin E TPGS is about 1:1 to 1:6. In one embodiment, the ratio of the first purified cannabinoid to Vitamin E TPGS is about 1:1 to 1:4. In one embodiment, the ratio of the first purified cannabinoid to Vitamin E TPGS is about 1:1 to 1:2. In one embodiment, the compounds disclosed herein comprise a terpene.

In one embodiment, the compounds disclosed herein comprise a purified terpene.

Examples of terpenes within the context of this disclosure include: 7,8-dihydro-alpha-ionone, 7,8-dihydro-beta-ionone, Acetanisole, Acetic Acid, Acetyl Cedrene, Anethole, Anisole, Benzaldehyde, Bergamotene (Alpha-cis-Bergamotene) (Alpha-trans-Bergamotene), Bisabolol (Beta-Bisabolol), Alpha, Bisabolol, Borneol, Bornyl Acetate, Butanoic/Butyric Acid, Cadinene (Alpha-Cadinene) (Gamma-Cadinene), Cafestol, Caffeic acid, Camphene, Camphor, Capsaicin, Carene (Delta-3-Carene), Carotene, Carvacrol, Dextro-Carvone, Laevo-Carvone, Caryophyllene (Beta-Caryophyllene), Caryophyllene oxide, Cedrene (Alpha-Cedrene) (Beta-Cedrene), Cedrene Epoxide (Alpha-Cedrene Epoxide), Cedrol, Cembrene, Chlorogenic Acid, Cinnamaldehyde, Alpha-amyl-Cinnamaldehyde, Alpha-hexyl-Cinnamaldehyde, Cinnamic Acid, Cinnamyl Alcohol, Citronellal, Citronellol, Cryptone, Curcumene (Alpha-Curcumene) (Gamma-Curcumene), Decanal, Dehydrovomifoliol, Diallyl Disulfide, Dihydroactinidiolide, Dimethyl Disulfide, Eicosane/Icosane, Elemene (Beta-Elemene), Estragole, Ethyl acetate, Ethyl Cinnamate, Ethyl maltol, Eucalyptol/1,8-Cineole, Eudesmol (Alpha-Eudesmol) (Beta-Eudesmol) (Gamma-Eudesmol), Eugenol, Euphol, Farnesene, Farnesol, Fenchol (Beta-Fenchol), Fenchone, Geraniol, Geranyl acetate, Germacrenes, Germacrene B, Guaia-1(10),11-diene, Guaiacol, Guaiene (Alpha-Guaiene), Gurjunene (Alpha-Gurjunene), Herniarin, Hexanaldehyde, Hexanoic Acid, Humulene (Alpha-Humulene) (Beta-Humulene), Ionol (3-oxo-alpha-ionol) (Beta-Ionol), Ionone (Alpha-Ionone) (Beta-Ionone), Ipsdienol, Isoamyl Acetate, Isoamyl Alcohol, Isoamyl Formate, Isoborneol, Isomyrcenol, Isopulegol, Isovaleric Acid, Isoprene, Kahweol, Lavandulol, Limonene, Gamma-Linolenic Acid, Linalool, Longifolene, Alpha-Longipinene, Lycopene, Menthol, Methyl butyrate, 3-Mercapto-2-Methylpentanal, Mercaptan/Thiols, Beta-Mercaptoethanol, Mercaptoacetic Acid, Allyl Mercaptan, Benzyl Mercaptan, Butyl Mercaptan, Ethyl Mercaptan, Methyl Mercaptan, Furfuryl Mercaptan, Ethylene Mercaptan, Propyl Mercaptan, Thenyl Mercaptan, Methyl Salicylate, Methylbutenol, Methyl-2-Methylvalerate, Methyl Thiobutyrate, Myrcene (Beta-Myrcene), Gamma-Muurolene, Nepetalactone, Nerol, Nerolidol, Neryl acetate, Nonanaldehyde, Nonanoic Acid, Ocimene, Octanal, Octanoic Acid, P-Cymene, Pentyl butyrate, Phellandrene, Phenylacetaldehyde, Phenylethanethiol, Phenylacetic Acid, Phytol, Pinene, Beta-Pinene, Propanethiol, Pristimerin, Pulegone, Quercetin, Retinol, Rutin, Sabinene, Sabinene Hydrate, cis-Sabinene Hydrate, trans-Sabinene Hydrate, Safranal, Alpha-Selinene, Alpha-Sinensal, Beta-Sinensal, Beta-Sitosterol, Squalene, Taxadiene, Terpin hydrate, Terpineol, Terpine-4-ol, Alpha-Terpinene, Gamma-Terpinene, Terpinolene, Thiophenol, Thujone, Thymol, Alpha-Tocopherol, Tonka Undecanone, Undecanal, Valeraldehyde/Pentanal, Verdoxan, Alpha-Ylangene, Umbelliferone, or Vanillin.

Within the context of this disclosure, the term terpene includes the α-(alpha), β-(beta), γ-(gamma), oxo-, isomers, or any combinations thereof.

In one embodiment, the purified terpene is chosen from Limonene, Nerolidol, Beta-Myrcene, Linalool, Alpha-Caryophyllene, Beta-Caryophyllene, Alpha-Pinene, Beta-Pinene, Alpha-Bisabolol, Delta-3-Carene, Borneol, p-Cymene, Eucalyptol, Alpha-Humulene, Alpha-Terpineol, Terpinolene, Pulegone, Camphene, or Geraniol.

In select embodiments, the water-soluble formulations of the present disclosure include at least one carrier oil to reduce the viscosity of the cannabinoids or cannabis-derived compounds and/or provide other suitable properties. Further, at least in the case of solid cannabinoids or cannabis-derived compounds (e.g., crystalline CBD), the carrier oil aids in its dissolution and allows for emulsification of the cannabinoid and cannabis-derived compounds.

Thus, in an embodiment, the present disclosure provides a formulation comprising a cannabinoid or a cannabis-derived compound; Vitamin E TPGS, and a carrier oil. In other embodiments, the present disclosure provides a formulation comprising a cannabinoid or a cannabis-derived compound; Vitamin E TPGS, a terpene, and a carrier oil. Water-soluble formulations comprising a carrier oil may represent preferred embodiments, for example having regard to the disclosure herein.

In an embodiment, the carrier oil is an "oily medium". By "oily medium" it is meant to refer to a medium capable of dissolving lipophilic or hydrophobic compounds, such as cannabinoids. Particularly suitable carrier oils include natural oils as known in the art, for example, edible vegetable oils. In some alternative embodiments, the carrier oils can include synthetic edible oils, for example, hydrogenated vegetable oils, medium chain triglyceride (MCT) oils, and the like and combinations thereof.

A non-limiting list of exemplary carrier oils includes ethanol, isopropanol, dimethyl sulfoxide, acetone, ethyl acetate, pentane, heptane, diethyl ether, medium-chain triglycerides (MCT oil), medium-chain fatty acids (e.g., caproic acid, caprylic acid, capric acid, lauric acid), long-chain triglycerides (LCT oil), long-chain fatty acids (e.g., myristic acid, palmitic acid, stearic acid, arachidic acid, linoleic acid), monoglycerides (e.g. glyceryl monostearate, glyceryl hydroxystearate, glyceryl monoleate, winterized glyceryl monoleate, monolaurin, glyceryl monolinoleate, Maisine™ CC, Peceol™), coconut oil, corn oil, canola oil, olive oil, avocado oil, vegetable oil, flaxseed oil, palm oil, palm kernel oil, peanut oil, sunflower oil, rice bran oil, safflower oil, jojoba oil, argan oil, grapeseed oil, castor oil, wheat germ oil, peppermint oil, hemp oil, sesame oil, terpenes, terpenoids, beta-myrcene, linalool, alpha-pinene, beta-pinene, beta-caryophyllene, caryophyllene oxide, alpha-humulene, nerolidol, D-limonene, L-limonene, para-cymene, eugenol, farnesol, geraniol, phytol, menthol, terpineol, alpha-terpineol, benzaldehyde, hexyl acetate, methyl salicylate, eucalyptol, ocimene, terpinolene, alpha-terpinene, isopulegol, guaiol, alpha-bisabolol and combinations thereof. Other suitable carrier oils include Labrasol™, Labrafac™ Lipophile WL 1349, Labrafil™ M1944, Peceol™, Plurol Oligiue™ CC 497, Transcutol™ HP, Tween™ 20, Tween™ 40, Tween™ 45, Tween™ 60, Tween™ 65, Tween™ 80, Tween™ 81, Tween™ 85, Gelucire™ 48/16, and combinations thereof. In a particularly suitable embodiment, the carrier oil is Maisine™ CC.

In an embodiment, a combination of carrier oils may be used in the water-soluble formulations. When more than one carrier is used, they may be used at any amount relative to the other. In an embodiment, the first carrier oil and the second carrier oil may be used at a ratio between 10:1 and 1:10, between 9:1 and 1:9, between 8:1 and 1:8, between 7:1 and 1:7, between 6:1 and 1:6, between 5:1 and 1:5, between 4:1 and 1:4, between 3:1 and 1:3, or between 2:1 and 1:2 by weight to each other. In an embodiment, the two carrier oils may be used at about a ratio of 3:1, 2:1, 1:1, 1:2 or 1:3 by weight to each other. In an embodiment, the two carrier oils may be used at about a 1:1 by weight ratio to each other.

In an embodiment, the water-soluble formulations of the present disclosure and/or products produced therefrom (e.g. beverages or foodstuffs) may include a ratio of carrier oil(s):cannabinoid or cannabis-derived compound of between 10:1 and 1:10, between 9:1 and 1:9, between 8:1 and 1:8, between 7:1 and 1:7, between 6:1 and 1:6, between 5:1 and 1:5, between 4:1 and 1:4, between 3:1 and 1:3, or between 2:1 and 1:2 by weight. In an embodiment, the ratio of carrier oil(s):cannabinoid or cannabis-derived may be about 3:1, 2:1, 1:1, 1:2 or 1:3 by weight. In an embodiment, the ratio of carrier oil(s):cannabinoid or cannabis-derived compound may be about 1:1 by weight.

In an embodiment, the carrier oil may improve the stability of the emulsion, for example by preventing Ostwald ripening of the water-soluble formulation.

In an embodiment, the carrier oil may contribute to providing rapid onset of the cannabinoid or cannabis-derived compound in the water-soluble formulation or a beverage prepared therefrom. The carrier oil may improve the rate of absorption and/or onset of a medicinal, therapeutic and/or recreational effect of the cannabinoids. In an embodiment, the rapid onset occurs within 60 minutes, within 30 minutes, with 15 minutes, or less from administration of the water-soluble formulation to a subject (e.g. in the form of a beverage). The carrier oil may also improve the rate of release of the cannabinoids into a beverage to provide an improved medicinal, therapeutic or recreational effect.

In an embodiment, the carrier oil is comprised of monoglycerides. The monoglycerides may be of a single type (e.g. glyceryl monolinoleate) or may be a mixture of different types. The monoglycerides may include only the monoglyceride ester, or may include one or both of di- and triglycerides. In some embodiments, the monoglyceride fraction is predominant over the di- and triglyceride components. In some embodiments, the di- or triglyceride fractions may be predominant over the monoglycerides, such as for example in Maisine™ CC. In an embodiment, the carrier oil is Maisine™ CC. In an embodiment, the Maisine™ CC contributes to rapid onset of the cannabinoids or cannabis-derived compounds.

In select embodiments, the water-soluble formulations may include up to 20% by weight carrier oil. In an embodiment, the formulations include from about 0.01% by weight to 10% by weight, more particularly from about 0.1% by weight to about 8% by weight, even more particularly from about 0.5% by weight to about 5% by weight, and even more particularly still from about 1.0% by weight to about 3% by weight carrier oil. In select embodiments, the water-soluble formulation may include about 1%, about 2%, about 3%, about 4%, about 5%, about 6%, about 7%, about 8%, about 9%, about 10% by weight carrier oil.

In one embodiment, the purified cannabinoid is contained within a micelle of Vitamin E TPGS.

As used herein, the term "micelle" refers to a collection of molecules arranged alongside one another in a spherical form often having a pocket inside. In one embodiment, the micelle comprises a lipid molecule. In one embodiment, the lipid molecule comprises both a hydrophobic and hydrophilic region. In one embodiment, the micelle is in a solvent. In one embodiment, the hydrophilic region is in contact with surrounding solvent, sequestering the hydrophobic region in the micelle centre. In one embodiment, the micelle is in water and the polar group is on the outside and a hydrophobic end sequesters inside the spherical shape. In one embodiment, the micelle is a reverse micelle, i.e., the hydrophilic region of a molecule is surrounded by a non-polar solvent resulting in a water in oil system. In one embodiment, the reverse micelle comprises hydrophobic groups extended away from the center while hydrophilic groups are sequestered inside the spherical shape.

As used herein, the term "contained within" refers to molecules, e.g. cannabinoids and/or terpenes, that are sequestered inside a spherical shape formed by micelles and reverse micelles. In one embodiment, a cannabinoid contained within a micelle allows said cannabinoid to disperse or dissolve within an aqueous formulation.

The formations may include one or more emulsifiers to stabilize the mixture of emulsified cannabinoids in the carrier oils described above, to reduce the particle size of the particles in the mixture (e.g. to about 50 nm) and/or to provide other suitable properties.

Any suitable emulsifier may be used. In an embodiment, the emulsifier is an ionic emulsifier. In an embodiment, the emulsifier is a non-ionic emulsifier. In an embodiment, the water-soluble formulations comprise two emulsifiers, where one is an ionic emulsifier and the other is a non-ionic emulsifier.

Without limitation, phospholipids can act as emulsifiers, enabling oils to form a colloid with water. Phospholipids are one of the components of lecithin.

Without limitation, the emulsifier in the water-soluble formulations may be a lecithin. Lecithin is a term commonly used to describe a group of fatty acid substances found in plant and animal tissues. Exemplary sources of lecithin include, without limitation, lecithin which is found in egg-yolks, as well as being extracted from soy beans (i.e., soy lecithin), sunflower (i.e. sunflower lecithin), canola (i.e. canola lecithin), rapeseed (i.e. rapeseed lecithin), cottonseed (i.e. cottonseed lecithin), and animal fats. Lecithin is used as a food additive in many products, and can be purchased as a dietary supplement. Lysolecithins are typically used for water-oil emulsions like margarine, due to their higher HLB ratio.

Any type of lecithin may be used in the practice of the present disclosure. In an embodiment, the lecithin is a soy lecithin, sunflower lecithin, canola lecithin, rapeseed lecithin, cottonseed lecithin, or any combination thereof. In a particular embodiment, the lecithin is a soy lecithin. In an embodiment, the lecithin is a sunflower lecithin.

Other particularly suitable emulsifiers include, for example, members of the ALCOLEC™ family of lecithins (e.g. ALCOLEC™ F-100, ALCOLEC™ EM, ALCOLEC™ S, ALCOLEC™ BS, ALCOLEC™ HL, ALCOLEC™ H 20, ALCOLEC™ EXTRA-A, ALCOLEC™ E 35, ALCO-LEC™ E 60 or ALCOLEC™ HR), including deoiled soy lecithin, sucrose monoesters (e.g. Habo Monoesters P90, SE-50, SE-70, SE-110 or SE-150), GELUCIRE™ 48/16, rhamnolipids, LABRASOL™, PLUROL™ Oliquie CC, alpha-tocopherol, and combinations thereof.

Other embodiments of emulsifiers may include, for example and without limitation, Gum Arabic, Quillaja extract, PURITY GUM™ ULTRA, pectin (e.g. citrus pectin, sugar beet pectin, apple pectin, etc.), chitosan, Q-NATU-RALE™, and other like compounds.

In an embodiment, the emulsifier in the water-soluble formulations of the present disclosure may be an emulsifier comprising Quillaja saponins. The emulsifier comprising Quillaja saponins may be from any suitable source. As will be appreciated, Quillaja saponins may be derived from a Quillaja tree, such as for example a Quillaja saponaria tree or a Quillaja brasiliensis tree. In a particular embodiment, the emulsifier comprising Quillaja saponins is derived from a Quillaja saponaria tree. In an embodiment, the emulsifier comprising Quillaja saponins is a Q-NATURALE™ emulsifier (Ingredion Incorporated, USA), a Saponin from Quallaja Bark (such as for example supplied by Sigma Aldrich, USA), Saponin Quillaja sp. (Sigma Aldrich, USA), a Quillaja extract (such as for example Quillaja extract E 999;), purified Quillaja saponins (e.g. from Sigma Aldrich, USA), a modified Quillaja extract, or combinations thereof.

In an embodiment, the emulsifier comprising Quillaja saponins is a Q-NATURALE™ emulsifier. In an embodiment, the Q-NATURALE™ emulsifier comprises Q-NATURALE™ 200, Q-NATURALE™ 200V, or a combination thereof.

In an embodiment, the Q-NATURALE™ emulsifier is Q-NATURALE™ 200. Q-NATURALE™ 200 is described as a natural emulsifier extracted from Quillaja trees and comprising about 65-75% saponin (dry basis) (Ingredion Incorporated, USA). However, modifications and alterations to Q-NATURALE™ 200 are also encompassed herein.

In an embodiment, the Q-NATURALE™ emulsifier is Q-NATURALE™ 200V. Q-NATURALE™ 200V is described as a naturally-derived liquid emulsifier derived from the Quillaja Saponaria Molina tree comprising about 13-16% Saponin (wet basis) (Ingredion Incorporated, USA). However, modifications and alterations to Q-NATURALE™ 200V are also encompassed herein.

In an embodiment, the water-soluble formulations of the present disclosure comprise a soy lecithin as an emulsifier, alone or in combination with other emulsifiers. In an embodiment, the soy lecithin is ALCOLEC™ F-100 or ALCOLEC™ EM.

In an embodiment, the water-soluble formulations of the present disclosure comprise a sunflower lecithin as an emulsifier, alone or in combination with other emulsifiers. In an embodiment, the sunflower lecithin is ALCOLEC™ HL or ALCOLEC™ H-20.

In an embodiment, the water-soluble formulations of the present disclosure comprise a sucrose monoester as an emulsifier, alone or in combination with other emulsifiers. The sucrose monoester may be sucrose monopalmitate, sucrose monolaurate, sucrose monostearate, or any combination thereof. For any one of these embodiments, the sucrose monoester may comprise a small quantity of diester. In a particular embodiment, the sucrose monoester is sucrose monopalmitate.

In an embodiment, the water-soluble formulations of the present disclosure comprise emulsifier comprising Quillaja saponins as an emulsifier, alone or in combination with other emulsifiers. In an embodiment, the emulsifier comprising Quillaja saponins is Q-NATURALE™ 200, Q-NATURALE™ 200V, or a combination thereof.

In an embodiment, a combination of emulsifiers may be used in the water-soluble formulations. When more than one emulsifier is used, they may be used at any amount relative to the other. In an embodiment, the first emulsifier and the second emulsifier may be used at a ratio between 20:1 and 1:20, between 15:1 and 1:15, between 10:1 and 1:10, or between 5:1 and 1:5 by weight to each other. In an embodiment, the two emulsifiers may be used at about a 3:1, 2:1, 1:1, 1:2 or 1:3 by weight ratio to each other. In an embodiment, the two emulsifiers may be used at about a 1:1 by weight ratio to each other.

For example, a combination of emulsifiers may be used to strengthen the emulsion as compared to when one emulsifier is used alone. This may be particularly suitable for certain beverages or aqueous solutions, for example where incompatibilities arise between the ingredients of the aqueous solution and the emulsion system. Emulsion instability may arise, for example, due to incompatibilities of a single emulsifier with different pH conditions, different ionic conditions, different oxygen levels, and different packaging materials.

In an embodiment, the water-soluble formulation of the present disclosure includes two or more emulsifiers. In an embodiment, the emulsifiers are selected from lecithins and sucrose monoesters. In an embodiment, the water-soluble formulations comprise two emulsifiers, one selected from a lecithin and one selected from a sucrose monoester. In an embodiment, the two emulsifiers are a soy lecithin and a sucrose monopalmitate. In select embodiments, the lecithin and sucrose monoester are combined in a ratio of between 10:1 and 1:10 (w/w), between 9:1 and 1:9 (w/w), between 8:1 and 1:8 (w/w), between 7:1 and 1:7 (w/w), between 6:1 and 1:6 (w/w), between 5:1 and 1:5 (w/w), between 4:1 and 1:4 (w/w), between 3:1 and 1:3 (w/w), or between 2:1 and 1:2 (w/w). In an embodiment, the lecithin and sucrose monoester are combined in a ratio of about 2:1 (w/w), about 1.5:1 (w/w), about 1:1 (w/w), about (w/w), about 1:1.5 (w/w), or about 1:2 (w/w) of lecithin to SME. In an embodiment, the lecithin and sucrose monoester are combined in a ratio of about 1:1 (w/w).

In select embodiments, the water-soluble formulations may include up to about 25% by weight emulsifier, more particularly up to about 15% by weight emulsifier, and more particularly still up to about 12.5% by weight emulsifier. In select embodiments, the water-soluble formulations may include up to 10% by weight emulsifier. In an embodiment, the formulations include from about 0.01% by weight to 10% by weight, more particularly from about 0.1% by weight to about 8% by weight, even more particularly from about 0.5% by weight to about 5% by weight, and even more particularly still from about 1.0% by weight to about 3% by weight emulsifier. In select embodiments, the water-soluble formulation may include about 1%, about 2%, about 3%, about 4%, about 5%, about 6%, about 7%, about 8%, about 9%, about 10%, about 11%, about 12%, about 13%, about 14%, or about 15% by weight emulsifier.

In an embodiment, the water-soluble formulations of the present disclosure and/or the products produced therefrom (e.g. beverages and foodstuffs) may include a ratio of emulsifier(s):cannabinoid or cannabis-derived compound of between 100:1 and 1:10 by weight, between 75:1 and 1:10 by weight, between 50:1 and 1:10 by weight, between 25:1 and 1:10 by weight or between 10:1 and 1:10 by weight. In an embodiment, the ratio of emulsifier(s):cannabinoid or *Cannabis*-derived compound may be about 5:1, 4:1, 3:1, 2:1, 1:1, 1:2, 1:3, 1:4 or 1:5 by weight. In an embodiment, the ratio of emulsifier(s):cannabinoid or *Cannabis*-derived compound may be about 1:1 by weight. In an embodiment, the ratio of emulsifier(s):cannabinoid or *Cannabis*-derived compound may be about 2.5:1 by weight.

Disclosed herein, is a method of making an aqueous cannabinoid formulation comprising adding 0-3% water, by mass percent, to a composition comprising a first purified cannabinoid and Vitamin E TPGS.

As used herein, the term "aqueous cannabinoid formulation" refers to a solution wherein a first purified cannabinoid and Vitamin E TPGS are dispersed throughout water and wherein the water acts as a solvent. In one embodiment, the aqueous cannabinoid formulation is made by methods disclosed herein. In one embodiment, the aqueous cannabinoid formulation comprises a second purified cannabinoid. In one embodiment, the aqueous cannabinoid formulation comprises a third purified cannabinoid. In one embodiment, the aqueous cannabinoid formulation comprises a first purified terpene. In one embodiment, the aqueous cannabinoid formulation comprises a second purified terpene.

In one embodiment, water accounts for between 0-10% of the mass percent of the aqueous cannabinoid formulation. In one embodiment, water accounts for between 0-5% of the mass percent of the aqueous cannabinoid formulation. In one embodiment, water accounts for between 0-3% of the mass percent of the aqueous cannabinoid formulation. In one embodiment, water accounts for between 0-1% of the mass percent of the aqueous cannabinoid formulation.

In one embodiment, the first purified cannabinoid is THC.

In one embodiment, the aqueous cannabinoid formulations disclosed herein comprise 50 to 99.9% THC by percent mass.

In one embodiment, the first purified cannabinoid is THCA.

In one embodiment, the aqueous cannabinoid formulations disclosed herein comprise 50 to 99.9% THCA by percent mass.

In one embodiment, the first purified cannabinoid is THCV.

In one embodiment, the aqueous cannabinoid formulations disclosed herein comprise 50 to 99.9% THCV by percent mass.

In one embodiment, the first purified cannabinoid is THCVA.

In one embodiment, the aqueous cannabinoid formulations disclosed herein comprise 50 to 99.9% THCVA by percent mass.

In one embodiment, the first purified cannabinoid is CBC.

In one embodiment, the aqueous cannabinoid formulations disclosed herein comprise 50 to 99.9% CBC by percent mass.

In one embodiment, the first purified cannabinoid is CBCA.

In one embodiment, the aqueous cannabinoid formulations disclosed herein comprise 50 to 99.9% CBCA by percent mass.

In one embodiment, the first purified cannabinoid is CBCV.

In one embodiment, the aqueous cannabinoid formulations disclosed herein comprise 50 to 99.9% CBCV by percent mass.

In one embodiment, the first purified cannabinoid is CBCVA.

In one embodiment, the aqueous cannabinoid formulations disclosed herein comprise 50 to 99.9% CBCVA by percent mass.

In one embodiment, the first purified cannabinoid is CBD.

In one embodiment, the aqueous cannabinoid formulations disclosed herein comprise 50 to 99.9% CBD by percent mass.

In one embodiment, the first purified cannabinoid is CBDA.

In one embodiment, the aqueous cannabinoid formulations disclosed herein comprise 50 to 99.9% CBDA by percent mass.

In one embodiment, the first purified cannabinoid is CBDV.

In one embodiment, the aqueous cannabinoid formulations disclosed herein comprise 50 to 99.9% CBDV by percent mass.

In one embodiment, the first purified cannabinoid is CBDVA.

In one embodiment, the aqueous cannabinoid formulations disclosed herein comprise 50 to 99.9% CBDVA by percent mass.

In one embodiment, the first purified cannabinoid is CBG.

In one embodiment, the aqueous cannabinoid formulations disclosed herein comprise 50 to 99.9% CBG by percent mass.

In one embodiment, the first purified cannabinoid is CBGA.

In one embodiment, the aqueous cannabinoid formulations disclosed herein comprise 50 to 99.9% CBGA by percent mass.

In one embodiment, the first purified cannabinoid is CBGV.

In one embodiment, the aqueous cannabinoid formulations disclosed herein comprise 50 to 99.9% CBGV by percent mass.

In one embodiment, the first purified cannabinoid is CBGVA.

In one embodiment, the aqueous cannabinoid formulations disclosed herein comprise 50 to 99.9% CBGVA by percent mass.

As used herein, the term "water soluble" refers to a compound or compounds dissolvable in water or liquid. In one embodiment, water soluble comprises dissolving a compound in water. In one embodiment, dissolving comprises heating. In one embodiment, dissolving comprises stirring. In one embodiment, dissolving comprises shaking. In one embodiment, dissolving comprises mixing. In one embodiment, a powder is water soluble. In one embodiment, a first purified cannabinoid composition is water soluble.

The water-soluble formulations of the present disclosure may include a surfactant.

In one particularly suitable embodiment, the surfactant is a glycerin-based carrier surfactant. By "carrier surfactant", it is intended to refer to the feature that the surfactant is the continuous phase (carrier) in which the other components of the water-soluble formulation are dispersed (e.g. the cannabinoids, carrier oil, and emulsifier). It further acts as a surfactant in enabling the formulations of the present disclosure in being water-soluble. By "glycerin-based", it is meant that the majority component of the surfactant is glycerin. It is envisioned that the glycerin may have other compounds dissolved or suspended therein. Alternatively, the glycerin-based surfactant may be comprised solely of glycerin.

In an embodiment, the glycerin-based carrier surfactant may be present in the water-soluble formulation in an amount between about 10% and about 97% by weight, between about 20% and about 97% by weight, between about 30% and about 97% by weight, between about 40% and about 97% by weight, between about 50% and about 97%, between about 60% and about 97% by weight, between about 70% and about 97%, between about 80% and about 97%, or between about 90% and about 97%.

In a particular embodiment, the glycerin-based carrier surfactant may be present in the water-soluble formulation in an amount between about 60% and about 97% by weight. In select embodiments, the glycerin-based carrier surfactant may be present in the water-soluble formulation in an amount between about 70% and about 97% by weight, more particularly between about 80% and about 97% by weight, and even more particularly between about 90% and about 97% by weight. In an embodiment, the glycerin-based carrier surfactant may be present in the water-soluble formulation in an amount of about 60%, about 61%, about 62%, about 63%, about 64%, about 65%, about 66%, about 67%, about 68%, about 69%, about 70%, about 71%, about 72%, about 73%, about 74%, about 75%, about 76%, about 77%, about 78%, about 79%, about 80%, about 81%, about 82%, about 83%, about 84%, about 85%, about 86%, about 87%, about 88%, about 89%, about 90%, about 91%, about 92%, about 93%, about 94%, about 95%, about 96%, or about 97% by weight.

In an embodiment, the water-soluble formulations of the present disclosure and/or products produced therefrom (e.g. beverages or foodstuffs) may include a ratio of glycerin-based carrier surfactant:cannabinoid or cannabis-derived compound of between 10000:1 and 4:1 by weight, between about 1000:1 and 4:1 by weight, between about 750:1 and about 4:1, between about 500:1 and 4:1 by weight, between about 300:1 and 4:1 by weight, between about 200:1 and 4:1 by weight, between about 100:1 and 4:1 by weight, between about 100:1 and 10:1 by weight, or between about 100:1 and 25:1 by weight. In an embodiment, the ratio of glycerin-based carrier surfactant:cannabinoid or cannabis-derived may be about 250:1, 200:1, 150:1, 100:1, 95:1, 90:1, 85:1, 80:1, 75:1, 70:1, 65:1, 60:1, 55:1, 50:1, 45:1, 40:1, 35:1, 30:1, 25:1, 20:1, 15:1, 10:1 or 5:1. In an embodiment, the ratio of glycerin-based carrier surfactant:cannabinoid or cannabis-derived compound may be about 100:1, 99:1, 98:1, 97:1, about 96:1, about 95:1, about 94:1, about 93:1, about 92:1, about 91:1, about 90:1, about 89:1, about 88:1, about 87:1, about 86:1, about 85:1, about 84:1, about 83:1, about 82:1, about 81:1, or about 80:1 by weight.

In an embodiment, the water-soluble formulations of the present disclosure and/or products produced therefrom (e.g. beverages or foodstuffs) may include a ratio of glycerin-based carrier surfactant:emulsifier(s) of between 10000:1 and 4:1 by weight, between about 1000:1 and 4:1 by weight, between about 750:1 and about 4:1, between about 500:1 and 4:1 by weight, between about 300:1 and 4:1 by weight, between about 200:1 and 4:1 by weight, between about 100:1 and 4:1 by weight, between about 100:1 and 10:1 by weight, between about 100:1 and 25:1 by weight. In an embodiment, the ratio of glycerin-based carrier surfactant:emulsifier(s) may be about 250:1, 200:1, 150:1, 100:1, 95:1, 90:1, 85:1, 80:1, 75:1, 70:1, 65:1, 60:1, 55:1, 50:1, 45:1, 40:1, 35:1, 30:1, 25:1, 20:1, 15:1, 10:1 or 5:1. In an embodiment, the ratio of glycerin-based carrier surfactant:emulsifier(s) may be about 100:1, 99:1, 98:1, 97:1, about 96:1, about 95:1, about 94:1, about 93:1, about 92:1, about 91:1, about 90:1, about 89:1, about 88:1, about 87:1, about 86:1, about 85:1, about 84:1, about 83:1, about 82:1, about 81:1, or about 80:1 by weight. In an embodiment, the ratio of glycerin-based carrier surfactant:emulsifier(s) may be about 10:1, about 9:1, about 8:1, about 7:1, about 6:1, or about 5:1.

In an embodiment, the water-soluble formulations of the present disclosure and/or products produced therefrom (e.g. beverages or foodstuffs) may include a ratio of glycerin-based carrier surfactant:carrier oil(s) of between 10000:1 and 5:1 by weight, between about 1000:1 and 5:1 by weight, between about 750:1 and about 5:1, between about 500:1 and 5:1 by weight, between about 300:1 and 5:1 by weight, between about 200:1 and 5:1 by weight, between about 100:1 and 5:1 by weight, between about 100:1 and 10:1 by weight, between about 100:1 and 25:1 by weight. In an embodiment, the ratio of glycerin-based carrier surfactant:carrier oil(s) may be about 250:1, 200:1, 150:1, 100:1, 95:1, 90:1, 85:1, 80:1, 75:1, 70:1, 65:1, 60:1, 55:1, 50:1, 45:1, 40:1, 35:1, 30:1, 25:1, 20:1, 15:1, 10:1 or 5:1. In an embodiment, the ratio of glycerin-based carrier surfactant:carrier oil(s) may be about 100:1, 99:1, 98:1, 97:1, about 96:1, about 95:1, about 94:1, about 93:1, about 92:1, about 91:1, about 90:1, about 89:1, about 88:1, about 87:1, about 86:1, about 85:1, about 84:1, about 83:1, about 82:1, about 81:1, or about 80:1 by weight.

In an embodiment, the glycerin-based carrier surfactant is glycerin. In an embodiment, the glycerin is a natural or synthetic glycerin. In an embodiment, the glycerin is a vegetable glycerin. As used herein, "vegetable glycerin"

refers to the glycerin being made from plant oils. In an embodiment, the vegetable glycerin is made from soybean, coconut or palm oils.

The use of higher amounts of glycerin in the water-soluble formulations of the present disclosure is unusual as typically cannabis-derived formulations are made as oil-in-water emulsions having water as the main component. It was found, however, in the water-soluble formulations of the present disclosure that even when small amounts of water were used as an alternative to glycerin, the resulting formulation was opaque suggesting larger average particle sizes of emulsified cannabinoids within the formulation.

In an embodiment, the water-soluble formulations include a surfactant other than a glycerin-based carrier surfactant. The other surfactant may be used as an alternative to the glycerin-based carrier surfactant or in addition to the glycerin-based carrier surfactant.

In an embodiment, the other surfactant is used as an alternative to the glycerin-based carrier surfactant. In such embodiments, most suitably the alternate surfactant is likewise a carrier surfactant. In an embodiment, the other surfactant has chemical, physical and/or functional properties similar to glycerin.

In an embodiment, the other surfactant is used in addition to the glycerin-based carrier surfactant. In an embodiment, the glycerin-based carrier surfactant may be the predominant surfactant by weight (e.g. >50% by weight) or by volume (e.g. >50% by volume). In other embodiments, the glycerin-based carrier surfactant may be the minority surfactant by weight (e.g. <50% by weight) or by volume (e.g. <50% by volume). In an embodiment, there may be 2, 3, 4, 5 or more other surfactants in addition or in alternative to a glycerin-based carrier surfactant.

Other suitable surfactants that can be used as alternatives or in addition to a glycerin-based carrier surfactant include, for example and without limitation, propylene glycol, class 3 solvents (e.g., ethanol, isopropanol), long chain alcohols, terpenes (found in cannabis or not), other poly-alcohols, a polysorbate (e.g. Tween™ 20, Tween™ 40, Tween™ 45, Tween™ 60, Tween™ 65, Tween™ 80, Tween™ 81 and Tween™ 85), a polyglyceryi (e.g. polyglyceryl monoesters or polyglyceryl multi-esters), a long chain PEG (e.g. BRIJ™ surfactants), and the like and combinations thereof.

In an embodiment, where the water-soluble formulations include other surfactants in addition to or in alternative to a glycerin-based carrier surfactant, the total amount of surfactant in the water-soluble formulation may be between about 10% and about 97% by weight, between about 20% and about 97% by weight, between about 30% and about 97% by weight, between about 40% and about 97% by weight, between about 50% and about 97%, between about 60% and about 97% by weight, between about 70% and about 97%, between about 80% and about 97%, or between about 90% and about 97%.

In a particular embodiment, where the water-soluble formulations include other surfactants in addition to or in alternative to a glycerin-based carrier surfactant, the total amount of surfactant in the water-soluble formulation may be between about 60% and about 97% by weight. In select embodiments, the total amount of surfactant in the water-soluble formulation may be between about 70% and about 97% by weight, more particularly between about 80% and about 97% by weight, and even more particularly between about 90% and about 97% by weight. In an embodiment, the total amount of surfactant in the water-soluble formulation may be about 60%, about 61%, about 62%, about 63%, about 64%, about 65%, about 66%, about 67%, about 68%, about 69%, about 70%, about 71%, about 72%, about 73%, about 74%, about 75%, about 76%, about 77%, about 78%, about 79%, about 80%, about 81%, about 82%, about 83%, about 84%, about 85%, about 86%, about 87%, about 88%, about 89%, about 90%, about 91%, about 92%, about 93%, about 94%, about 95%, about 96%, or about 97% by weight.

In an embodiment, the water-soluble formulations of the present disclosure and/or products produced therefrom (e.g. beverages or foodstuffs) may include a ratio of glycerin-based carrier surfactant:other surfactant(s) of between 1000:1 and 1:1000 by weight, between about 1000:1 and 1:100 by weight, between about 1000:1 and 1:10 by weight, between about 1000:1 and 1:1 by weight, between 100:1 and 1:1000 by weight, between 10:1 and 1:1000 by weight, between 1:1 and 1:1000 by weight, between 100:1 and 1:100 by weight, between about 100:1 and 1:1 by weight, between 1:1 and 1:100 by weight, between 10:1 and 1:10 by weight, between about 10:1 and 1:1, between 1:1 and 1:10 by weight, between 5:1 and 1:5 by weight. In an embodiment, the ratio of glycerin-based carrier surfactant:other surfactant(s) may be about 1000:1, 750:1, 500:1, 250:1, 200:1, 150:1, 100:1, 95:1, 90:1, 85:1, 80:1, 75:1, 70:1, 65:1, 60:1, 55:1, 50:1, 45:1, 40:1, 35:1, 30:1, 25:1, 20:1, 15:1, 10:1, 5:1, or 1:1.

In an embodiment, the present disclosure relates to a water-soluble formulation comprising a cannabinoid or cannabis-derived compound, a carrier oil, an emulsifier, a glycerin-based carrier surfactant and TPGS.

In select embodiments, the water-soluble formulations of the present disclosure comprise the cannabinoid or cannabis-derived compound; the carrier oil; and the emulsifier at an about equivalent amount by weight. In an embodiment, the water-soluble formulations comprise up to 10% by weight of the cannabinoid or cannabis-derived compound; up to 10% by weight of the carrier oil, and up to 10% by weight of the emulsifier. In an embodiment, the water-soluble formulations comprise about 1%, about 2%, about 3%, about 4%, about 5%, about 6%, about 7%, about 8%, about 9%, or about 10% by weight of the cannabinoid or cannabis-derived compound, the carrier oil, and the emulsifier.

In an embodiment, the present disclosure relates to a water-soluble formulation comprising TPGS, a cannabinoid or cannabis-derived compound, a carrier oil, a first emulsifier, a second emulsifier, and a glycerin-based carrier surfactant.

In an embodiment, the present disclosure relates to a water-soluble formulation comprising TPGS, a cannabinoid or a cannabis-derived compound, monoglycerides, soy lecithin, sucrose monoester, all in a vegetable glycerin.

In an embodiment, the present disclosure relates to a water-soluble formulation comprising TPGS, a cannabinoid distillate or a cannabinoid isolate; monoglycerides; a soy lecithin; and a sucrose monoester, in a vegetable glycerin.

In an embodiment, the water-soluble formulations of the present disclosure comprise an about equivalent amount by weight of the soy lecithin and the sucrose monoester.

In an embodiment, the water-soluble formulations comprise up to 10% by weight of each of the cannabinoid or cannabis-derived compound; the carrier oil, the soy lecithin; and the sucrose monoester. In an embodiment, the water-soluble formulations comprise an about equivalent amount by weight of each of the cannabinoid or cannabis-derived compound; the monoglycerides; the soy lecithin; and the sucrose monoester. In an embodiment, the equivalent amount is about 1%, about 2%, about 3%, about 4%, about 5%, about 6%, about 7%, about 8%, about 9%, or about 10% by weight of water-soluble formulation.

In an embodiment, the present disclosure relates to a water-soluble formulation comprising TPGS, a cannabinoid or a cannabis-derived compound; an emulsifier comprising *Quillaja* saponins; a carrier oil, and a glycerin-based carrier surfactant. In an embodiment, the water-soluble formulations comprise up to 10% by weight of the cannabinoid or cannabis-derived compound; up to 10% by weight of the carrier oil, up to 15% by weight of the emulsifier comprising *Quillaja* saponins; and at least 60% by weight of the glycerin-based carrier surfactant. In an embodiment, the ratio of glycerin-based carrier surfactant:emulsifier comprising *Quillaja* saponins in the water-soluble formulation or product produced therefrom is about 25:1, about 20:1, about 15:1, about 10:1, about 9:1, about 8:1, about 7:1, about 6:1, or about 5:1. In an embodiment, the ratio of glycerin-based carrier surfactant:carrier oil is about 75:1, about 70:1, about 65:1, about 60:1, about 55:1, about 50:1, about 45:1, about 40:1, about 35:1, about 30:1, or about 25:1.

In an embodiment, the water-soluble formulations of the present disclosure are liquid, such as an emulsion. The term "emulsion" is well known in the art and refers to a mixture of two or more liquids that are normally immiscible (unmixable or unblendable), where a first liquid is dispersed in small globules (internal or discontinuous phase) throughout a second liquid (external or continuous phase).

In an embodiment, the water-soluble formulations of the present disclosure are a powder. The powder may, for example, be prepared by drying the liquid water-soluble formulations of the present disclosure. In an embodiment, the powder is of low calorie (e.g. less than 10 kcal per 250 mg of the powder formulation).

In select embodiments, the water-soluble formulations of the present disclosure may be used in combination with a stabilizer. The stabilizer may be added to the water-soluble formulation or to a product (e.g. aqueous solution, beverage, topical or food) that is produced using the water-soluble formulations.

Thus, in an embodiment, the water-soluble formulations of the present disclosure comprise a stabilizer. In an embodiment, a product produced from the water-soluble formulations comprises a stabilizer. The stabilizer may be added to the product before, during or after admixture with the water-soluble formulation.

As used herein, a stabilizer is any substance used to prevent an unwanted change in state in the water-soluble formulation or product produced therefrom (e.g. prevent degradation). The stabilizer may be used to improve or maintain the stability of the water-soluble formulation itself (e.g. the emulsion) or to improve or maintain the stability of individual components of the water-soluble formulation or product (e.g. the cannabinoids). For example, cannabinoids or cannabis-derived compounds within the water-soluble formulation or product produced therefrom may be susceptible to degradation, such as oxidative degradation. Thus, in an embodiment, the stabilizer protects the cannabinoids or cannabis-derived compounds from degradation.

Non-limiting examples of stabilizers include hydrocolloids (such as alginate, agar, carrageenan, cellulose and cellulose derivatives, gelatin, guar gum, gum Arabic, locust bean gum, pectin, starch and xanthan gum), antioxidants (water-soluble and/or oil-soluble), and chelating agents.

Water-soluble antioxidants may enhance the stability of the water-soluble formulation and/or products containing the water-soluble formulation by reacting with reactive species in the polar (e.g. aqueous) phase. Oil-soluble antioxidants may enhance the chemical stability of the water-soluble formulation and/or products containing the water-soluble formulation by reacting with reactive species in the oil phase. Non-limiting examples of reactive species include peroxides, free radicals and oxygen.

Non-limiting examples of antioxidants include ascorbic acid, ascorbic acid-6 palmitate (ascorbyl palmitate), ascorbyl stearate, alpha-tocopherol, beta-carotene, butylated hydroxyaniline (BHA), butylated hydroxytolulene (BHT), delta-tocopherol, dodecyl gallate, erythorbic acid, gamma-tocopherol, glutathione, lipoic acid, octyl gallate, propyl gallate, mixed tocopherols (e.g. Fortium™), vitamin E (e.g. Tocobiol™ Plus CP60), Tocobiol™ Plus L-70, Tocobiol™ Plus GP, Tocobiol™ Plus PV, Nutrabiol T, sodium ascorbate, sodium erythorbate, and Extract of Rosemary (OxiKan™ CL).

In an embodiment, the water-soluble formulations of the present disclosure are used in combination with an antioxidant stabilizer. In an embodiment, the antioxidant stabilizer is ascorbic acid-6 palmitate (E-304) or a tocopherol.

Chelating agents may enhance the chemical stability of the water-soluble formulation and/or products containing the water-soluble formulation by binding dissolved metal ions. Dissolved metal ions, for example copper ions or iron ions, may catalyze oxidation-reduction reactions (redox) between dissolved oxygen and the components of the water-soluble formulation or product. In particular, cannabinoids may be susceptible to oxidation catalyzed by dissolved metal ions. Non-exclusive examples of chelating agents include: aminopolycarboxylic acids including ethylenediaminetetraacetic acid (EDTA) and its various salts, calixarenes, porphyrins, bipyridines, citric acid, iminodisuccinic acid, and polyaspartic acid.

In an embodiment, the water-soluble formulations of the present disclosure are used in combination with a chelating agent as a stabilizer. In an embodiment, the chelating agent is ethylenediaminetetraacetic acid (EDTA). In an embodiment, the EDTA is disodium EDTA, calcium disodium EDTA, or tetrasodium EDTA. In a particular embodiment, the EDTA is calcium disodium EDTA.

The stabilizer may be added to the water-soluble formulation or to the product produced therewith. In an embodiment, the stabilizer is added to the product separately from the water-soluble formulation. In an embodiment, the stabilizer is added to the product within 30 minutes before or after the water-soluble formulation is added.

In an embodiment, the stabilizer is added to the water-soluble formulation. In an embodiment, the stabilizer is added to the water-soluble formulation within 30 minutes before the water-soluble formulation is added to the product. In an embodiment, the stabilizer is added to the water-soluble formulation within 1 minute before the water-soluble formulation is added to the product.

The stabilizer may be added to the water-soluble formulation or to the product produced therewith at any suitable concentration. In an embodiment, the stabilizer is added in a minor amount. As used herein, by "in a minor amount", it is meant that the stabilizer is added to the water-soluble formulation or to the resultant product at a concentration of between 1 ppm and 100 ppm, between 10 ppm and 50 ppm, or between 20 ppm and 30 ppm.

The use of a stabilizing agent is sometimes to the detriment of other important characteristics of a consumer product, e.g. a beverage. For example, additional components such as stabilizers may promote turbidity, cloudiness or an undesired taste profile in the final product. Also, stabilization of one component (e.g. the emulsion) may have a negative effect on the stability of another component (e.g. the active ingredient). This may be particularly so for emulsification products where the development of a water-soluble formulation that is clear in appearance, easy to drink ("clean" taste profile), shelf stable, and quick acting are all relevant considerations.

In an embodiment, the water-soluble formulations of the present disclosure are used in combination with a stabilizer. In an embodiment, the stabilizer is one that complements one or more components of the water-soluble formulation to provide a product that is clear in appearance, chemically stable, shelf stable, and/or suitable for use in a broad range of product having different characteristics (e.g. pH, high or low ionic conditions, wide array of ingredients, etc.). By "chemically stable", it is meant that the stability of the active ingredient is improved.

In an embodiment, a chelating agent is used in combination with a water-soluble formulation of the present disclosure. In an embodiment, the water-soluble formulation is one that comprises one or both of an emulsifier selected from lecithin and sucrose monoester. In an embodiment, a chelating agent is used in combination with a water-soluble formulation of the present disclosure that comprises both lecithin and sucrose monoester as emulsifiers. In an embodiment, the chelating agent is EDTA.

As shown herein, sucrose monoester and a chelating agent appear to complement each other in that the sucrose monoester strengthens the emulsion (e.g. stabilizes the emulsion) as evidenced by improved clarity, while the chelating agent stabilizes the cannabinoids. This is an advantageous result since it was found that a chelating agent renders the aqueous product more turbid. Combined with a sucrose monoester, the clarity of the product improves.

The combination of sucrose monoester and lecithin provide better clarity and stability then either alone, and the inclusion of a chelating agent in the aqueous solution appears to provide even greater protection to the cannabinoid, without sacrificing other key characteristics of the product. The chelating agent was found to provide significant protection of THC and CBD from degradation.

In an embodiment, the present disclosure relates to a water-soluble formulation comprising TPGS, a cannabinoid or cannabis-derived compound, a carrier oil, an emulsifier, and a glycerin-based carrier surfactant, which is used in combination with a stabilizer to prepare a beverage, topical or food.

In an embodiment, the present disclosure relates to a water-soluble formulation comprising TPGS, a cannabinoid or cannabis-derived compound, a carrier oil, a first emulsifier, a second emulsifier, and a glycerin-based carrier surfactant, which is used in combination with a stabilizer to prepare a beverage, topical or food.

In an embodiment, the present disclosure relates to a water-soluble formulation comprising TPGS, a cannabinoid or a cannabis-derived compound, monoglycerides, soy lecithin, sucrose monoester, all in a vegetable glycerin, which is used in combination with a chelating agent to prepare a beverage, topical or food.

The water-soluble formulation and/or the products containing the water-soluble formulations may be treated to reduce the oxygen content as this may further enhance their chemical stability. For example, it was found that the rate of oxidative degradation of cannabinoids depends on the oxygen concentration in the product containing the water-soluble formulation. Reducing the oxygen concentration may thereby reduce the rate of oxidative degradation and enhance the chemical stability of the water-soluble formulation and/or the products containing the water-soluble formulation. Non-limiting examples of treatments to reduce oxygen concentration include: sparging (with nitrogen and/or other inert gases), freeze-pump-thaw cycling, and treatment with reducing agents (e.g. potassium metabisulphite).

In an embodiment, products made with the water-soluble formulation of the present disclosure are sparged after the water-soluble formulation is added. In an embodiment, the products are sparged within at least 60 minutes, at least 45 minutes, at least 30 minutes, at least 10 minutes, at least 5 minutes or less, after the water-soluble formulation is added. In an embodiment, the sparged products are also treated with reducing agents.

The water-soluble formulation and/or the products containing the water-soluble formulations may be treated with agents to adjust the pH. In an embodiment, the pH of the water-soluble formulation and/or the products containing the water-soluble formulation is adjusted to less than 4.5. In an embodiment, the pH of the water-soluble formulation and/or the products containing the water-soluble formulation is adjusted to between 2.5 and 4.5. In an embodiment, the pH of the water-soluble formulation and/or the products containing the water-soluble formulation is adjusted to between 3.8 and 4.3. In an embodiment, the water-soluble formulation and/or products containing the water-soluble formulation may contain buffers to maintain a constant pH.

In some embodiments, the water-soluble formulations or products (e.g. beverages, foodstuffs, etc.) of the present disclosure may further include additives, such as for example and without limitation terpenes, terpenoids, flavonoids, or any combination thereof. Such additives may be used to enhance flavour, viscosity, aroma and the like.

In an embodiment, the additives may be derived from cannabis plants. In an embodiment, the additives may be derived from natural sources other than a cannabis plant, such as a plant of a different species. Alternatively, in some embodiments, the additives may be synthetic or semi-synthetic compounds.

In one embodiment, the compositions disclosed herein comprise a second purified cannabinoid. In one embodiment, the compositions disclosed herein comprise a third purified cannabinoid. In one embodiment, the compositions disclosed herein comprise more than three purified cannabinoids. In one embodiment, the compositions disclosed herein comprises a total purified cannabinoid content.

As used herein, the term "total purified cannabinoid content" refers to the entire amount of identifiable cannabinoids within a composition. In one embodiment, the total purified cannabinoid content is measured by grams. In one embodiment, the total purified cannabinoid content is measured by volume. In one embodiment, the total purified cannabinoid content is measured by moles. In one embodiment, the total purified cannabinoid content is measured by mass percent. In one embodiment, the total purified cannabinoid content is determined by chromatography, e.g., HPLC. In one embodiment, the total purified cannabinoid content comprises terpenes.

In one embodiment, the compositions disclosed herein comprise a ratio of Vitamin E TPGS to total purified cannabinoid content of about 90:10 to about 70:30 by mass. In one embodiment, the compositions disclosed herein comprise a ratio of Vitamin E TPGS to total purified cannabinoid content of about 85:15 to about 75:25 by mass. In one embodiment, the compositions disclosed herein comprise a ratio of Vitamin E TPGS to total purified cannabinoid content of about 82:18 to about 78:22 by mass. In one embodiment, the compositions disclosed herein comprise a ratio of Vitamin E TPGS to total purified cannabinoid content of about 80:20 to about 70:30 by mass. In one embodiment, the compositions disclosed herein comprise a ratio of Vitamin E TPGS to total purified cannabinoid content of about 90:10 to about 80:20 by mass. In one embodiment, the ratio of the total purified cannabinoid content to Vitamin E TPGS is about 1:1 to 1:50. In one embodiment, the ratio of the total purified cannabinoid content to Vitamin E TPGS is about 1:11 to 1:50. In one embodiment, the ratio of the total purified cannabinoid content to Vitamin E TPGS is about 1:11 to 1:40. In one embodiment, the ratio of the total purified cannabinoid content to Vitamin E TPGS is about 1:11 to 1:30. In one embodiment, the ratio of the total purified cannabinoid content to Vitamin E TPGS is about 1:11 to 1:25. In one embodiment, the ratio of the total purified cannabinoid content to Vitamin E TPGS is about 1:11 to 1:20. In some embodiment, the ratio of the total purified cannabinoid content to Vitamin E TPGS is about 1:12 to 1:20, 1:13 to 1:20, 1:14 to 1:20, 1:15 to 1:20, 1:16 to 1:20, 1:17 to 1:20, 1:18 to 1:20, 1:19 to 1:20 or 1:20. In one embodiment, the ratio of the total purified cannabinoid content to Vitamin E TPGS is about 1:11 to 1:19. In one embodiment, the ratio of the total purified cannabinoid content to Vitamin E TPGS is about 1:12 to 1:19. In some embodiment, the ratio of the total purified cannabinoid content to Vitamin E TPGS is about 1:13 to 1:19, 1:14 to 1:19, 1:15 to 1:19, 1:16 to 1:19, 1:17 to 1:19, 1:18 to 1:19 or 1:19. In one embodiment, the ratio of the total purified cannabinoid content to Vitamin E TPGS is about 1:10 to 1:20. In one embodiment, the ratio of the total purified cannabinoid content to Vitamin E TPGS is about 1:11 to 1:19. In one embodiment, the ratio of the total purified cannabinoid content to Vitamin E TPGS is about 1:11 to 1:18. In one embodiment, the ratio of the total purified cannabinoid content to Vitamin E TPGS is about 1:11 to 1:17. In one embodiment, the ratio of the total purified cannabinoid content to Vitamin E TPGS is about 1:11 to 1:16. In some embodiments, the ratio of the total purified cannabinoid content to Vitamin E TPGS is about 1:11 to 1:15, 1:11 to 1:14, 1:11 to 1:13, 1:11 to 1:12, or 1:11. In one embodiment, the ratio of the total purified cannabinoid content to Vitamin E TPGS is about 1:12 to 1:25, about 1:13 to 1:25, about 1:14 to 1:25, about 1:15 to 1:25, about 1:16 to 1:25, about 1:17 to 1:25, about 1:18 to 1:25, about 1:19 to 1:25, about 1:20 to 1:25. In one embodiment the ratio of the total purified cannabinoid content to Vitamin E TPGS is about 1:11, 1:12, 1:13, 1:14, 1:15, 1:16, 1:17, 1:18, 1:19, 1:20, 1:21, 1:22, 1:23, 1:24, or 1:25. In one embodiment, the ratio of the total purified cannabinoid content to Vitamin E TPGS is about 1:1 to 1:10. In one embodiment, the ratio of the total purified cannabinoid content to Vitamin E TPGS is about 1:1 to 1:8. In one embodiment, the ratio of the total purified cannabinoid content to Vitamin E TPGS is about 1:1 to 1:6. In one embodiment, the ratio of the total purified cannabinoid content to Vitamin E TPGS is about 1:1 to 1:4. In one embodiment, the ratio of the total purified cannabinoid content to Vitamin E TPGS is about 1:1 to 1:2.

In an embodiment, the water-soluble formulations of the present disclosure and/or the products produced therefrom (e.g. beverages and foodstuffs) may include a ratio of TPGS:carrier oil(s) of between 2500:1 and 1:40000 by weight, between about 1000:1 and 1:20000 by weight, between about 500:1 and 1:10000 by weight, between about 250:1 and 1:5000 by weight, between about 125:1 and 1:2500, between about 75:1 and 1:1250, between about 50:1 and 1:500, and between about 25:1 and 1:250, between about 20:1 and 1:20, between about 10:1 and 1:10, between about 10:1 and 1:5, and between about 1:1 and 1:5. In an embodiment the ratio of TGPS:carrier oil(s) may be about: 250:1, 200:1, 150:1, 100:1, 95:1, 90:1, 85:1, 80:1, 75:1, 70:1, 65:1, 60:1, 55:1, 50:1, 45:1, 40:1, 35:1, 30:1, 25:1, 20:1, 15:1, 10:1, 5:1, 1:2, 1:1.5, or 1:1.

In an embodiment, the water-soluble formulations of the present disclosure and/or the products produced therefrom (e.g. beverages and foodstuffs) may include a ratio of TPGS:emulsifier(s) of between 10:1 and 1:2000 by weight, between about 10:1 and 1:1000 by weight, between about 10:1 and 1:500 by weight, between about 10:1 and 1:250 by weight, between about 10:1 and 1:125, between about 10:1 and 1:75, between about 10:1 and 1:50, between about 10:1 and 1:25, between about 10:1 and 1:20, between about 5:1 and 1:20, between about 5:1 and 1:15, and between about 1:1 and 1:15. In an embodiment the ratio of TGPS:emulsifier(s) may be about: 10:1, 9:1, 8:1, 7:1, 6:1, 5:1, 4:1, 3:1, 2:1, 1:1, 1:2, 1:3, 1:4, 1:5, 1:6, 1:7, 1:8, 1:9, 1:10, 1:11, 1:12, 1:13, 1:14, 1:15, 1:16, 1:17, 1:18, 1:19, 1:10, 1:100, 1:500, 1:1000, 1:1500, or 1:2000.

In an embodiment, the water-soluble formulations of the present disclosure and/or the products produced therefrom (e.g. beverages and foodstuffs) may include a ratio of TPGS:surfactant(s) of between 1:1 and 1:200000 by weight, between about 1:1 and 1:100000 by weight, between about 1:1 and 1:50000 by weight, between about 1:1 and 1:25000 by weight, between about 1:1 and 1:10000, between about 1:1 and 1:5000, between about 1:1 and 1:2500, between about 1:1 and 1:1500, between about 1:1 and 1:1000, between about 1:1 and 1:500, between about 1:1 and 1:250, between about 1:1 and 1:175, between about 1:2 and 1:90, between about 1:2 and 1:85, between about 1:2 to 1:25, between about 1:2 and 1:10, and between about 1:4 to 1:7. In an embodiment the ratio of TGPS:surfactant(s) may be about: 1:1, 1:2, 1:3, 1:4, 1:5, 1:6, 1:7, 1:8, 1:9, 1:10, 1:15, 1:20, 1:25, 1:30, 1:40, 1:50, 1:60, 1:70, 1:80, 1:90, 1:100, 1:125, 1:150, 1:175, 1:200, 1:500, 1:1000, 1:2000, 1:5000, 1:10000, 1:20000, 1:30000, 1:40000, 1:50000, 1:60000, 1:70000, 1:80000, 1:90000, 1:100000, 1:110000, 1:120000, 1:130000, 1:140000, 1:150000, 1:160000, 1:170000, 1:180000, 1:190000, or 1:200000.

In an embodiment, the water-soluble formulations of the present disclosure and/or the products produced therefrom (e.g. beverages and foodstuffs) may include a ratio of carrier oil(s):emulsifier(s) of between 1:250 and 20:1 by weight, between about 1:100 and 15:1 by weight, between about 1:50 and 15:1 by weight, between about 1:25 and 10:1 by weight, between about 1:10 and 10:1, between about 1:9 and 9:1, between about 1:8 and 8:1, between about 1:7 and 7:1, between about 1:6 and 6:1, between about 1:5 and 5:1, between about 1:4 and 4:1, between about 1:3 and 3:1, between about 1:2 and 2:1, between about 1:10 and 1:1, between about 1:5 and 1:1, between about 1:4 and 1:1, between about 1:3 and 1:1, between about 1:2 and 1:1 and about 1:1. In an embodiment the ratio of carrier oil(s):emulsifier(s) may be about: 20:1, 19:1, 18:1, 17:1, 16:1, 15:1, 14:1, 13:1, 12:1, 11:1, 10:1, 9:1, 8:1, 7:1, 6:1, 5:1, 4:1, 3:1, 2:1, 1:1, 1:2, 1:3, 1:4, 1:5, 1:6, 1:7, 1:8, 1:9, 1:10, 1:11, 1:12, 1:13, 1:14, 1:15, 1:16, 1:17, 1:18, 1:19, or 1:20.

In an embodiment, the water-soluble formulations of the present disclosure and/or the products produced therefrom (e.g. beverages and foodstuffs) may include a ratio of carrier oil(s):cannabinoid(s) of between 1:2500 and 2000:1 by weight, between about 1:1250 and 1000:1 by weight, between about 1:1000 and 500:1 by weight, between about 1:500 and 250:1 by weight, between about 1:250 and 200:1, between about 1:200 and 100:1, between about 1:100 and 50:1, between about 1:50 and 25:1, between about 1:25 and 25:1, between about 1:10 and 10:1, between about 1:5 and 5:1, between about 1:4 and 4:1, between about 1:3 and 3:1, between about 1:2 and 2:1, between about 1:10 and 5:1, between about 1:5 and 2:1, between about 1:5 and 1:1, between about 1:4 and 1:1, between about 1:3 and 1:1, between about 1:2 and 1:1, and about 1:1. In an embodiment the ratio of carrier oil(s):cannabinoid(s) may be about: 20:1, 19:1, 18:1, 17:1, 16:1, 15:1, 14:1, 13:1, 12:1, 11:1, 10:1, 9:1, 8:1, 7:1, 6:1, 5:1, 4:1, 3:1, 2:1, 1:1, 1:2, 1:3, 1:4, 1:5, 1:6, 1:7, 1:8, 1:9, 1:10, 1:11, 1:12, 1:13, 1:14, 1:15, 1:16, 1:17, 1:18, 1:19, or 1:20.

In one embodiment, the composition disclosed herein is in the form of a tablet.

As used herein, the term "tablet" refers to a dry solid. In one embodiment, the tablet is composed of active ingredients, e.g., a first purified cannabinoid. In one embodiment, the tablet is in dry form. In one embodiment, the tablet is made by molding or compressing a powder. In one example, the tablet is made by compressing a dry powder of the active ingredients and a filler (e.g., an excipient) forming a pill shape. In one embodiment, the tablet is a dosage of an active ingredient. In one embodiment, the dosage is determined by the active ingredient(s), e.g., a first purified cannabinoid. In one embodiment, the tablet comprises an effervescent.

A dosage form is that object delivered to a subject human or non-human organism for testing, placebo, recreational, therapeutic or other use. In an embodiment, the compositions of the present disclosure may be formulated as dosage forms for administration to a subject (e.g. the liquid or powder formulation within a soft gel capsule; a tablet comprising the powder formulation; the liquid or powder formulation absorbed onto or into a solid material).

Thus, in some embodiments, the dried powder formulation can be formulated into pharmaceutical dosage forms comprising an effective amount of particles. Although mainly pharmaceutical dosage forms for oral administration such as tablets and capsules are envisaged, the particles of the present disclosure can also be used to prepare pharmaceutical dosage forms e.g., for rectal administration. Preferred dosage forms are those adapted for oral administration shaped as a tablet. They can be produced by conventional tabletting techniques with conventional ingredients or excipients and with conventional tabletting machines.

As known in the art, tablet blends (including the powder formulations disclosed herein and any other conventional tablet ingredient or excipient) may be dry-granulated or wet-granulated before tabletting. The tabletting process itself is otherwise standard and readily practised by moulding a tablet from a desired blend or mixture of ingredients into the appropriate shape using a conventional tablet press.

Tablets may further be film-coated to improve taste or provide ease of swallowing and an elegant appearance. Many suitable polymeric film-coating materials are known in the art. A preferred film-coating material is hydroxypropyl methylcellulose HPMC, especially HPMC 2910 5 mPas. Other suitable film-forming polymers also may be used herein, including hydroxypropylcellulose and acrylate-methacrylate copolymers. Besides a film-forming polymer, the film coat may further comprise a plasticizer (e.g. propylene glycol) and, optionally, a pigment (e.g. titanium dioxide). The film-coating suspension also may contain talc as an anti-adhesive.

In one embodiment, the composition disclosed herein comprises an alcohol.

In one embodiment, the composition disclosed herein comprises ethanol.

As used herein, the term "ethanol" refers to a compound with the following structural formula:

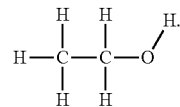

Ethanol is a volatile, flammable, colorless liquid with a slight chemical odor. Ethanol is often used as an antiseptic, a solvent, a fuel, and an active fluid in thermometers because of its low freezing point. Ethanol is also present in some tinctures and alcoholic beverages.

In one embodiment, the compositions disclosed herein comprise a sugar.

As used herein, the term "sugar" refers to a compound used by organisms to store energy. Sugar is often used in food products as a sweetener and may provide other benefits, e.g., preservative, texture modifier, flavoring agent, bulking agent, etc. In one embodiment, the sugar is a carbohydrate. In one embodiment, the sugar is a monosaccharide. In one embodiment, the sugar is a disaccharide. In one embodiment, the sugar is a oligosaccharide. In one embodiment, the sugar is a short composed of carbon, hydrogen, and oxygen. In one embodiment, the sugar has the formula $C_nH_{2n}O_n$, wherein n is an integer. In one embodiment, n is 3. In one embodiment, n is 4. In one embodiment, n is 5. In one embodiment, n is 6. In one embodiment, n is 7.

Within the context of this disclosure, the term sugar may also refer to a number of naturally occurring or synthetic compounds imparting sweetness. For example, maltodextrin, sorbitol, stevia, mannitol, aspartame, sucralose, isomalt, xylitol, etc.

In one embodiment, the sugar is fructose. In one embodiment, the sugar is sucrose. In one embodiment, the compositions disclosed herein comprise more than one sugar. In one embodiment, the compositions disclosed herein comprise sucrose and fructose.

In some embodiments, the water-soluble formulations may further include additives such as one or more flavonoids.

As used herein, the term "flavonoid" refers to any compound of a large class of plant pigments having a structure based on or similar to that of flavone. Chemically, flavonoids have the general structure of a 15-carbon skeleton, which consists of two phenyl rings and a heterocyclic ring.

Within the context of this disclosure, the term "flavonoids" includes bioflavonoids, isoflavonoids and neoflavonoids. Isoflavones use the 3-phenylchromen-4-one skeleton (with no hydroxyl group substitution on carbon at position 2). Examples include: Genistein, Daidzein, Glycitein, Isoflavanes, Isoflavandiols, Isoflavenes, Coumestans, and Pterocarpans.

Within the context of this disclosure, the term "flavonoids" also includes anthocyanidins, anthoxanthins, flavanones, flavanonols and flavens.

Flavonoids are widely distributed in plants, fulfilling many functions. Flavonoids are the most important plant pigments for flower colouration, producing yellow or red/blue pigmentation in petals designed to attract pollinator animals. In higher plants, flavonoids are involved in UV filtration, symbiotic nitrogen fixation and floral pigmentation. They may also act as chemical messengers, physiological regulators, and cell cycle inhibitors. Some flavonoids have inhibitory activity against organisms that cause plant diseases, e.g. *Fusarium oxysporum*.

Sources of flavonoids include, without limitation, cannabis, parsley, blueberries, black tea, citrus, wine, cocoa and peanut.

Additional exemplary flavonoids for use in the formulations include Apigenin, beta-sitosterol, cannaflavin A, kaempferol, luteolin, orientin, quercetin and combinations thereof.

In an embodiment, the flavonoid is cannaflavin.

In some embodiments, the water-soluble formulations or products (e.g. beverages, foodstuffs, etc.) of the present disclosure may include any number of other additives, including without limitation a solvent, a bulking agent, an antioxidant, or a nutritional supplement. These components may be used either alone or in combination to improve, for example, the chemical and/or physical properties, stability, nutritional profile, taste, colour and/or viscosity, of the water-soluble formulations disclosed herein or a beverage or foodstuff produced therefrom. In an embodiment, the antioxidant may be ascorbyl palmitate or alpha-tocopherol.

Yet other suitable types of modifiers and additives that may be used in the water-soluble formulations or products (e.g. beverages, foodstuffs, etc.) disclosed herein include viscosity modifiers, natural emulsifiers, oils, thickening agents, minerals, acids, bases, vitamins, flavours, colourants, sweeteners (e.g. liquid sweeteners), bitter blockers and the like and combinations thereof, as known in the beverage and food arts, to provide improved solubility, stability, bioavailability, colour and taste.

Nutritional supplements comprise substances useful to the consumer of the formulations disclosed herein, or beverages or foodstuffs prepared therewith, for maintenance of normal body health. Suitable nutritional supplements may comprise, for example, essential nutrients including vitamins, dietary minerals, amino acids and fatty acids. Exemplary nutritional supplements may include vitamin A, vitamin B1, vitamin B2, vitamin B3, vitamin B5, vitamin B6, vitamin B7, vitamin B9, vitamin B12, vitamin C, vitamin D, vitamin E, vitamin K calcium, phosphorus, potassium, sulfur, sodium, chlorine, magnesium, iron, cobalt, copper, zinc, molybdenum, iodine, selenium, manganese, nickel, chromium, fluorine, boron, strontium histidine, isoleucine, leucine, lysine, methionine, cysteine, phenylalanine, tyrosine, threonine, tryptophan, valine, alpha-linoleic acid, and linoleic acid.

Viscosity modifiers include any compound or agent capable of altering the viscosity of the formulations disclosed herein, or a beverage or foodstuff produced therewith. Exemplary embodiments of viscosity modifiers include anti-caking agents, antifoaming agents, bulking agents, coagulation agents, gelling agents, glazing agents, humectants, leavening agents, tenderizers, and thickeners. In an embodiment, the viscosity modifying agent may be an unmodified starch, pregelatinized starch, cross-linked starches, gums (e.g. guar gum, xanthum gum, acacia), polyvinyl pyrrolidone (PVP), polyethylene oxide, waxes (e.g. beeswax), and mixtures thereof.

Sweeteners include any compound or agent that is capable of sweetening the taste of the formulations disclosed herein, or a beverage or foodstuff produced therewith. The sweetener may be a natural sweetener or an artificial sweetener. The sweetener may be a solid, liquid or semi-liquid. Exemplary embodiments of sweeteners include sugars and sugar alcohols, and more particularly stevia, erythritol, and xylitol. In an embodiment, the sweetener may be a liquid sugar solution, such as without limitation those having a Brix value of about 67.5° Bx. In an embodiment, the sweetener may be an Isocane 67.5° Bx liquid sugar solution.

Bitter blockers include any compound or agent that is capable of reducing of blocking a bitter taste. Bitter blockers are commercially available from a variety of sources, such as Abelei Flavors, American International Chemical, LLC, E. A. Weber Flavors, F&F projects, Foodchem International Corporation, Gerson Lehrman Group, Givaudan, Joh. Barth & Sohn GmbH & Co. KG, Lifewise, Linguagen Corporation, Lipofoods, MycoTechnology, NTC Flavors, Senomyx, Inc., Tastesnaturel, Tastepoint, and Ultra International. Bitter blockers may be a natural product or an artificial product. The bitter blocker may be a solid, liquid, semi-liquid. Exemplary, non-limiting embodiments of bitter blockers include, adenosine 5'-monophosphate, BB68 (3-[1-[(3,5-dimethylisoxazol-4-yl)methyl]pyrazol-4-yl]-1-[(3-hydroxy-pheny-1)methyl]imidazolidine-2,4-dione), Clear Mask™ Bitter Clear L, Clear Mask™ Bitter Clear P, Clear Mask™ 506NA Powder, GG-605-390-4, NP-844-232-9 and QJ-615-696-6, Clear Mask™ BBF 902, TRUCLEAR™, CLEARTASTE™, Natural Flavor Powder, SimplyRich™ 121, TasteSolutions™ Nat Masking (bitter) Flavour #VB-889-616-8, and Bitter Masking-070546/FL.

In particularly suitable embodiments, the water-soluble formulations of the present disclosure are substantially free of cyclodextrins and modified starches, thereby reducing unnatural ingredients from end use products including the formulations.

Additionally, the water-soluble formulations of the present disclosure are suitably prepared to be low calorie. Particularly, in some embodiments, a 250 mL serving will provide less than 25 kilocalories (Kcal), more suitably less than 10 Kcal, and even more suitably less than 5 Kcal.

Disclosed herein is a new method of making a water soluble composition having a first purified cannabinoid, comprising:

separating a first purified cannabinoid from cannabis plant material;

adding the first purified cannabinoid to Vitamin E TPGS to create a mixture of Vitamin E TPGS and the first purified cannabinoid;

heating said mixture to a first temperature;

adding water to the mixture of Vitamin E TPGS and the first purified cannabinoid to create an aqueous cannabinoid formulation comprising the mixture of Vitamin E TPGS and the first purified cannabinoid; and cooling the aqueous formulation to a second temperature.

As used herein, the term "separating a first cannabinoid from cannabis plant material" refers to isolating a cannabinoid from the rest of the plant material, i.e., purifying a cannabinoid. Separation can be done by a number of techniques known in the art. For example, thin layer chromatography, high performance liquid chromatography, gas chromatography, electrophoresis, microscopy, supercritical fluid chromatography, etc.

As used herein, the term "plant material" refers to matter produced by a plant of genus cannabis, e.g., structural materials like cellulose and/or organelles used in the plant's metabolism. In one embodiment, the plant material is a leaf. In one embodiment, the plant material is a stem. In one embodiment, the plant material is a whole ground up plant.

As used herein, the term "adding" refers to combining two or compounds together, for example when forming a composition. In one embodiment, the compounds are in a gas phase. In one embodiment, the compounds are in a liquid phase. In one embodiment, the compounds are in a solid phase. In one embodiment, the compounds are in different states of matter. For example, one compound in a solid phase is combined with another compound in a liquid phase. In one embodiment, adding comprises mixing. In one embodiment, adding comprises heating. In one embodiment, adding comprises shaking.

As used herein, the term "heating" refers to raising the temperature of a substance. In one embodiment, heating comprises applying a heat source, e.g., a lamp, a hot plate, etc. In one embodiment, heating comprises placing a substance within a heat source, e.g., placing a sample into an oven. In one embodiment, heating comprises utilizing a fire. In one embodiment, heating comprises raising the temperature of a liquid, e.g., placing a liquid in a heat proof beaker and placing the beaker onto a hot plate.

As used herein, the term "cooling" refers to lowering the temperature of a substance. In one embodiment, cooling comprises dissipating heat through stirring. In one embodiment, cooling comprises placing a substance into a refrigerator. In one embodiment, cooling comprises placing a substance into a freezer. In one embodiment, cooling comprises allowing a substance to dissipate heat through equilibrium, e.g., allowing a substance to cool to ambient temperatures.

As used herein, the term "temperature" refers to a measurement of the average kinetic energy of the atoms or molecules in a system, e.g., a confined space, e.g., a room, a cup, a container, etc. In one embodiment, temperature measures the average kinetic energy of a room. In one embodiment, temperature measures the average kinetic energy of a sample. In one embodiment, temperature is measured by a thermometer. In one embodiment, temperature is measured by a thermocouple. In one embodiment, temperature is expressed in units of Kelvin. In one embodiment, temperature is expressed in units of Fahrenheit. In one embodiment, temperature is expressed in units of Celsius. It is understood, that temperatures expressed in Kelvin, Fahrenheit, or Celsius are convertible from one another and can refer to the same desired temperature. For example, 0 degrees Celsius, 32 degrees Fahrenheit, and 273 Kelvin all approximate the freezing temperature of water.

In one embodiment, there is a first temperature.

In one embodiment, there is a first temperature is between 50-110 degrees Celsius.

In one embodiment, there is a first temperature is between 60-100 degrees Celsius.

In one embodiment, there is a first temperature is between 70-90 degrees Celsius.

In one embodiment, there is a first temperature is between 75-85 degrees Celsius.

In one embodiment, there is a second temperature.

In one embodiment, there is a first temperature is between 0-50 degrees Celsius.

In one embodiment, there is a first temperature is between 10-40 degrees Celsius.

In one embodiment, there is a first temperature is between 20-30 degrees Celsius.

In one embodiment, the methods disclosed herein comprise:

sonicating the aqueous cannabinoid formulation comprising the mixture of Vitamin E TPGS and the first purified cannabinoid to create micelles;

freezing the aqueous cannabinoid formulation comprising the mixture of Vitamin E TPGS and the first purified cannabinoid;

lowering pressure of the aqueous cannabinoid formulation comprising the mixture of Vitamin E TPGS and the first purified cannabinoid; and removing water from the aqueous cannabinoid formulation comprising the mixture of Vitamin E TPGS and the first purified cannabinoid to create a dry powder.

As used herein, the term "sonicating" refers to applying sound energy. The chemical effects of sonic waves on chemical systems is called sonochemistry. Sonicating can be used for a variety of purposes, including, but is not limited to, producing nanoparticles, speeding dissolution, and/or disrupting biological material. Many variables, including the power, speed, and ratio of ingredients, can affect the properties of the resulting product. In one embodiment, the power of the sound energy applied can determine the size of micelles and/or reverse micelles.

As used herein, the term "freezing" refers to transforming a liquid or gas into a solid. In one embodiment, freezing comprises falling below a freezing point. In one embodiment, freezing comprises molecules gathering into clusters forming a crystal structure and growing continuously. In one embodiment, freezing comprises an exothermic process through the release of heat and pressure.

As used herein, the term "lowering the pressure" refers decreasing the force acting on an unit of area or increasing the area a force is acting on. In one embodiment, pressure is defined as force per unit area. In one embodiment, lowering pressure comprises keeping the force constant while increasing the area. In one embodiment, lowering the pressure comprises keeping the area constant while the force decreases. In one embodiment, pressure is expressed in pascals (Pa). In one embodiment, pressure is expressed in torres (Torr). In one embodiment, pressure is expressed in barye (Ba). In one embodiment, pressure is expressed in standard atmospheres (atm).

In some contexts, the word pressure refers to the vapor or equilibrium vapor pressure. Vapor pressure is the pressure exerted by vapor in thermodynamic equilibrium with its condensed phases, either solid or liquid, at a given temperature in a closed system.

As used herein, the term "removing water" refers to eliminating water from a composition such that the composition is substantially free from water. In one embodiment, the composition is 90% free from water. In one embodiment, the composition is 95% free from water. In one embodiment, the composition is 99% free from water. In one embodiment, removing water comprises heating the aqueous cannabinoid formulation. In one embodiment, removing water comprises drying the aqueous cannabinoid formulation for example, by applying a material that absorbs. In one embodiment, removing water comprises applying a vacuum to the aqueous cannabinoid formulation. In one embodiment, removing water comprises suctioning the aqueous cannabinoid formulation. In one embodiment, removing water comprises exposing the aqueous cannabinoid formulation to a desiccant.

In one embodiment, the method disclosed herein comprises adding water to the mixture of Vitamin E TPGS and purified cannabinoid to create an aqueous cannabinoid formulation comprising Vitamin E TPGS and between 1 to 50 mg of purified cannabinoid per mL of water.

In one embodiment, the method disclosed herein comprises adding water to the mixture of Vitamin E TPGS and purified cannabinoid to create an aqueous cannabinoid formulation comprising Vitamin E TPGS and between 5 to 20 mg of purified cannabinoid per mL of water.

In one embodiment, the method disclosed herein comprises adding water to the mixture of Vitamin E TPGS and purified cannabinoid to create an aqueous cannabinoid formulation comprising Vitamin E TPGS and between 10 to 15 mg of purified cannabinoid per mL of water.

In one embodiment, the method disclosed herein comprises adding between 5 to 20 mg of purified cannabinoid per mL of water.

In one embodiment, the method disclosed herein comprises adding between 6 to 18 mg of purified cannabinoid per mL of water.

In one embodiment, the method disclosed herein comprises adding between 8 to 15 mg of purified cannabinoid per mL of water.

In one embodiment, the method disclosed herein comprises adding between 10 to 12 mg of purified cannabinoid per mL of water.

In one embodiment, the method disclosed herein comprises sonicating the aqueous cannabinoid formulation of Vitamin E TPGS and purified cannabinoid for about 5 to 60 minutes.

In one embodiment, the method disclosed herein comprises sonicating the aqueous cannabinoid formulation of Vitamin E TPGS and purified cannabinoid for about 10 to 45 minutes.

In one embodiment, the method disclosed herein comprises sonicating the aqueous cannabinoid formulation of Vitamin E TPGS and purified cannabinoid for about 15 to 30 minutes.

In one embodiment, the method disclosed herein comprises sonicating the aqueous cannabinoid formulation of Vitamin E TPGS and purified cannabinoid for about 20 to 25 minutes.

In one embodiment, the micelles in the compositions disclosed herein are reverse micelles.

In one embodiment, the method disclosed herein comprises freezing the aqueous cannabinoid formulation, by lowering temperature to less than −20 degrees Celsius.

In one embodiment, the method disclosed herein comprises freezing the aqueous cannabinoid formulation, by lowering temperature to between 5 to −20 degrees Celsius.

In one embodiment, the method disclosed herein comprises freezing the aqueous cannabinoid formulation, by lowering temperature to between 0 to −30 degrees Celsius.

In one embodiment, the method disclosed herein comprises freezing the aqueous cannabinoid formulation, by lowering temperature to between −10 to −40 degrees Celsius.

In one embodiment, the method disclosed herein comprises freezing the aqueous cannabinoid formulation, by lowering temperature to between −20 to −50 degrees Celsius.

In one embodiment, the method disclosed herein comprises lowering the pressure of the aqueous cannabinoid formulation to less than 100 Torr.

The present disclosure is further directed to using the water-soluble formulations to form end use products such as ingestibles, topical solids and liquids. The ingestibles can include, for example, beverages, liquids and foodstuffs.

Thus, the water-soluble formulations of the present disclosure may be used in the preparation of foodstuffs and beverages. As used herein, a beverage is any drink that may be consumed by a subject. A foodstuff is any substance suitable for consumption as a food.

The compositions may be combined with any beverage-compatible or food-compatible ingredient. For example, water-soluble formulations of the present disclosure may be used directly in the preparation of foodstuffs and beverages, e.g. as an additive or ingredient. Powder formulations may be used either directly, e.g. as an additive or ingredient, or indirectly e.g. by first dissolving the powder in a solvent (e.g. water) to form a liquid composition prior to use. In some embodiments, the powder compositions may be added to beverage or foodstuff directly. In other embodiments, the powder formulations are diluted with a bulking agent. The pre-bulked and/or bulked powder compositions can be packaged for individual servings (e.g. sachets/packets), packages in bulk within a single container, or a combination thereof.

When used in beverages, the water-soluble formulations of the present disclosure further comprise a beverage liquid. Generally, beverage liquids are liquids meeting the common meaning of the term "biocompatible", which include materials that are not harmful to living tissue. Suitably, such beverage liquids comprise water, oil, alcohol; with or without additives or modifiers or both. Such beverage liquids can be divided into various groups such as plain/still water, carbonated water, alcohol, non-alcoholic drink, soft drinks, electrolyte drinks (e.g. sports drink beverages), fruit juice, vegetable juice, tea, coffee, milk, or other hot, room temperature or cold liquids used in drinks. Beverages can be caffeinated or non-caffeinated and may contain calories or not. Such beverages may be produced in ready to use form or be produced in a form suitable for preparation in final consumable form at or proximate to the time of ingestion.

Typically, beverage liquids will make up between about 50% and 99.99% by weight or by volume of the beverage. In an embodiment, beverage liquids will make up between about 60% and about 99.99% by weight or by volume of the beverage, more particularly between about 70% and about 99.99% by weight or by volume of the beverage, more particularly still between about 80% to about 99.99% by weight or by volume of the beverage, and even more particularly still between about 80% to about 99.99% by weight or by volume of the beverage. In an embodiment, the beverage liquid will make up between about 80% and about 99.99% by weight of the beverage. In an embodiment, the beverage liquid will make up between about 80% and about 99.9% by weight of the beverage, between about 80% and about 99%, or between about 80% and about 90% by weight of the beverage. In an embodiment, the beverage liquid will make up between about 95% and about 99.9% by weight of the beverage. In an embodiment, the beverage liquid will make up about 80%, about 81%, about 82%, about 83%, about 84%, about 85%, about 86%, about 87%, about 88%, about 89%, about 90%, about 91%, about 92%, about 93%, about 94%, about 95%, about 96%, about 97%, about 98%, about 99%, or more by weight of the beverage. In an embodiment, the beverage liquid will make up about 99.0%, about 99.1%, about 99.2%, about 99.3%, about 99.4%, about 99.5%, about 99.6%, about 99.7%, about 99.8%, or about 99.9% by weight of the beverage. In an embodiment, the beverage liquid is water. In an embodiment, additives may be present in addition to the quantity of beverage liquid. In an embodiment, a liquid additive (e.g. sweetener) may be present in addition to the quantity of beverage liquid.

In a particular embodiment, the beverage liquid will make up between about 80% and about 95% by weight of the beverage, and a liquid additive (e.g. sweetener) will make up between about 4.9% and about 14.9% by weight of the beverage. In select embodiments, the beverage liquid will make up about 80%, about 81%, about 82%, about 83%, about 84%, about 85%, about 86%, about 87%, about 88%, about 89%, about 90%, about 91%, about 92%, about 93%, about 94%, about 95% by weight of the beverage. In select embodiments, a liquid additive (e.g. sweetener) will make up about 18%, about 17%, about 16%, about 15%, about 14%, about 13%, about 12%, about 11%, about 10%, about 9%, about 8%, about 7%, about 6%, about 5%, about 4%, about 3% or less by weight of the beverage. In an embodiment, the beverage liquid is water and the liquid additive is a liquid sweetener, such as for example a 67.5° Bx (Brix) sugar solution.

Non-limiting examples of beverages that may be prepared with the water-soluble formulations of the present disclosure include but are not limited to: hot and cold beverages including water, fruit juice, vegetable juice, tea, coffee, softs drinks, energy drinks, alcohol, flavoured water, or single-serve beverage cartridges. Non-limiting examples of foodstuffs include baked goods (e.g. cookies, brownies, cake, pie, biscuits and pastries), candies (e.g. hard candy, soft candy, gummies, etc.), chocolates, lozenges, gum, mints, dried fruits, nuts, granola, truffles, caramels, chews, taffy, prepared meals, cooking ingredients (e.g. food additives, dry spices, honey, sugar, sweeteners, etc.), ground coffee, instant coffee and tea leaves.

The amount of the water-soluble formulation of the present disclosure added to beverages or foodstuffs will vary depending on the desired dosage of cannabinoids (e.g. THC and CBD) or cannabis-derived compound. For example, in some embodiments each serving, unit or item of foodstuff or beverage will contain between about 0.5 mg and about 100 mg of cannabinoids. In an embodiment, the foodstuff or beverage will contain between about 1.0 mg and about 50 mg of cannabinoids or cannabis-derived compound, more particularly between about 1.0 mg and about 25 mg of cannabinoids, between about 2.0 mg and about 20 mg, or between about 2.0 mg and about 10 mg of cannabinoids or cannabis-derived compound. In an embodiment, the foodstuff or beverage will contain about 0.5 mg, about 1.0 mg, about 1.5 mg, about 2.0 mg, about 2.5 mg, about 3.0 mg, about 3.5 mg, about 4.0 mg, about 4.5 mg, about 5.0 mg, about 5.5 mg, about 6.0 mg, about 6.5 mg, about 7.0 mg, about 7.5 mg, about 8.0 mg, about 8.5 mg, about 9.0 mg, about 9.5 mg, about 10.0 mg, about 10.5 mg, about 11.0 mg, about 11.5 mg, about 12.0 mg, about 12.5 mg, about 13.0 mg, about 13.5 mg, about 14.0 mg, about 14.5 mg, about 15.0 mg, about 15.5 mg, about 16.0 mg, about 16.5 mg, about 17.0 mg, about 17.5 mg, about 18.0 mg, about 18.5 mg, about 19.0 mg, about 19.5 mg, about 20.0 mg, about 20.5 mg, about 21.0 mg, about 21.5 mg, about 22.0 mg, about 22.5 mg, about 23.0 mg, about 23.5 mg, about 24.0 mg, about 24.5 mg, or about 25.0 mg of cannabinoids or cannabis-derived compound. The cannabinoids may be one type of cannabinoid (e.g. CBD or THC) or any combination of cannabinoids. In an embodiment, the cannabinoid is THC. In an embodiment, the cannabinoid is CBD.

In an embodiment, the foodstuff or beverage may contain a cannabinoid or cannabis-derived compound concentration of between about 0.01 mg/mL and about 2.5 mg/mL, more particularly between about 0.025 mg/mL and about 1.25 mg/mL, between about 0.025 mg/mL and about 1.0 mg/mL, or between about 0.05 mg/mL and about 0.1 mg/mL. In an embodiment, the foodstuff or beverage may contain a cannabinoid or cannabis-derived compound concentration of about 0.01 mg/mL, about 0.02 mg/mL, about 0.03 mg/mL, about 0.04 mg/mL, about 0.05 mg/mL, about 0.06 mg/mL, about 0.07 mg/mL, about 0.08 mg/mL, about 0.09 mg/mL, about 0.1 mg/mL, about 0.2 mg/mL, about 0.3 mg/mL, about 0.4 mg/mL, about 0.5 mg/mL, about 0.6 mg/mL, about 0.7 mg/mL, about 0.8 mg/mL, about 0.9 mg/mL, about 1.0 mg/mL, about 1.25 mg/mL, about 1.5 mg/mL, about 1.75 mg/mL, about 2.0 mg/mL, about 2.25 mg/mL, or about 2.5 mg/mL. The cannabinoid may be one type of cannabinoid (e.g. CBD or THC) or any combination of cannabinoids. In an embodiment, the cannabinoid is THC. In an embodiment, the cannabinoid is CBD.

In an embodiment, the product (e.g. beverage or foodstuff) may comprise between about 0.1% and about 25% by weight, particularly about 0.5% and about 25% by weight of the water-soluble formulation, more particularly between about 1% and about 10% by weight of the water-soluble formulation, and more particularly still between about 1% and about 5% by weight of the water-soluble formulation. In an embodiment, the product may comprise between about 0.5% and about 3% by weight of the water-soluble formulation. In some embodiments, low quantities by weight of the water-soluble formulation may be used due to advantageous properties of the water-soluble formulations of the present disclosure in stably formulating cannabinoids or cannabis-based compounds.

In one embodiment, the water-soluble formulations are mixed with an aqueous solution to prepare an end use product (e.g. beverage). The aqueous solution can include pure water alone, or an aqueous solution including water and additives such as the additives described above to improve end use product stability, bioavailability, colour, aroma and taste. Particularly, additives may include terpenes, terpenoids, flavonoids, viscosity modifiers, natural emulsifiers, oils, thickening agents, minerals, acids, bases, vitamins, flavours, colourants, sweeteners (liquid and/or solid), and the like and combinations thereof, as known in the beverage and food arts.

In an embodiment, the aqueous solution comprises a stabilizer as described herein. In an embodiment, the aqueous solution comprises a chelating agent. The chelating agent may be added before or after the water-soluble formulation is mixed with the aqueous solution. In an embodiment, the chelating agent is EDTA.

In some embodiments, the end products incorporating the water-soluble formulations of the present disclosure include less than 20% by weight glycerin, including less than less than 15% by weight, less than 10% by weight, less than 5% by weight, and less than 1% by weight glycerin.

Beverages may be packaged as individual packages, suitably single use packages, and multiple packages. The packaging can be in air tight containers. Packaging may be comprised of paper, plastic, metal, and glass. In an embodiment, the packaging may be Tetra Pak™0 packaging. Beverages may include bubble containing or producing liquids with dissolved gas or liquids capable of producing gas proximately in time of consumption. In one embodiment of the disclosure, the beverages, optionally comprising additives, modifiers or both, are convenient to consumers, and are manufactured at modest expense. Beverages with dissolved gas may be created by a method comprising addition of carbon dioxide, ozone, oxygen, and nitrogen. For beverages with dissolved gas, dissolved gas may be added to the beverage by methods comprising application of pressure, and adding water with the dissolved gas. The dissolved gas is released from the beverage when pressure is reduced as effervescence.

In another embodiment, the water-soluble formulations are absorbed into a solid material for use as an end use product. By way of example, the water-soluble formulations may be absorbed onto one or more of blotter paper, tea leaves, coffee grounds, spices and the like to allow for a convenient water-soluble edible or tea bag.

The compositions of the present disclosure are suitably low calorie, and can be used to prepare beverages and foodstuffs that are low calorie. Particularly, in some embodiments, a 250 mL or 2-5 g serving will provide less than 25 kilocalories (Kcal), more suitably less than 10 Kcal, and even more suitably less than 5 Kcal.

In some further embodiments, the water-soluble formulations are further dried to form a powder formulation for use in liquid beverages and foods. The above described formulations may be dried using any method as known in the drying arts to evaporate the water phase of the emulsion, and possibly none, some or essentially all of the carrier solvent. For example, in one embodiment, the formulations are spray dried to form the powder formulation. Alternative methods of preparing the dried powder formulation include, but are not limited to, pan coating, air-suspension coating, centrifugal extrusion, vibrational nozzle technique, freeze-drying or using a food dehydrator.

In some embodiments, the powder formulation can be diluted with a bulking agent or a mixture of bulking agents. Suitable bulking agents include, for example, gum arabic, waxy maize starch, dextrin, maltodextrin, polydextrose, inulin, fructooligosaccharide, sucrose, glucose, fructose, galactose, lactose, maltose, trehalose, cellobiose, lactulose, ribose, arabinose, xylose, lyxose, allose, altrose, mannose, gulose, talose, erythritol, threitol, arabitol, xylitol, mannitol, ribitol, galactitol, fucitol, inositol, maltitol, sorbitol, isomalt, lactitol, polyglycitol, iditol, volemitol, maltotriitol, maltotetraitol, maltol, stevia, stevio side, rebaudio side, neotame, sucralose, saccharin, sodium cyclamate, aspartame, acesulfame potassium, chitin, and chitosan. In an embodiment, the bulking agent is erythritol. In an embodiment, the bulking agent is sucrose. In an embodiment, the bulking agent is inositol. In an embodiment, the bulking agent is myo-inositol.

In some aspects, the bulking material may comprise a sweetener, pH modifier, pH stabilizer, antimicrobial preservative, antioxidant, texture modifier, colourant or combinations thereof.

In some embodiments, the bulked powder formulations comprise at least 0.001% by weight, and suitably from 0.001% by weight to about 3% by weight, of a cannabinoid or a cannabis-derived compound. More suitably, a dosage form for an exemplary product includes 10 milligram of tetrahydrocannabinol (THC) per serving. Assuming a 3.5 gram serving size, the bulk powder formulation would contain approximately 0.3% by weight of the primary cannabinoid (e.g. THC and/or CBD). Assuming a 5 gram sample size, the bulk powder formulation would contain approximately 0.2% by weight of the primary cannabinoid.

Once prepared, the powder formulation may be mixed directly in a liquid beverage or food or may first be dissolved in a solution to then be added to a liquid beverage or food. The powder formulation may be prepared and packaged using any packaging known in the art. For example, in one embodiment, the powder formulation may be packaged as a single serving or multiple servings in a metal, glass, or plastic container. In another embodiment, the powder formulation may be packaged as a single serving stick pack.

EXAMPLES

The following examples are for illustrative purposes and not meant to be limiting. The following examples are included to demonstrate various embodiments of the present disclosure. It should be appreciated by those of skill in the art that the techniques disclosed in the examples that follow represent techniques discovered by the inventors to function well in the practice of the present disclosure, and thus may be considered to constitute preferred modes for its practice. However, those of skill in the art should, in light of the present disclosure, appreciate that many changes can be made in the specific embodiments which are disclosed and still obtain a like or similar result without departing from the scope of the present disclosure.

Example 1

THC was purified, via chromatography, from a plant of genus cannabis, resulting in a clear, slightly yellow oil. The oil weighed 5.00 g. In a separate container 20.0 g of Vitamin E TPGS was measured. Both compounds were combined in a container with 50 mL of water. The solution was sonicated for 15-20 minutes until a homogeneous mixture was formed.

The solution was transferred to a tray, forming a thin layer of about 2 cm in depth. The tray was then placed in a freezer for 8 hours resulting in a solid sheet. The solid sheet was placed in a plastic bag and vacuumed sealed under reduced pressure for one hour. The tray was removed from the bag and placed in an oven for 1 hour. The tray cooled to ambient temperature and then the thin layer was scraped with a scraper to afford a powder. If clumping occurred, a mortar and pestle was used to make a finer powder. The micelles were measured with a refractometer.

Example 2

CBD was purified, via chromatography, from a plant of genus cannabis, resulting in a clear, slightly yellow oil. The oil weighed 5.00 g. In a separate container 20.0 g of Vitamin E TPGS was measured. Both compounds were combined in a container with 50 mL of water. The solution was sonicated for 15-20 minutes until a homogeneous mixture was formed.

The solution was transferred to a tray, forming a thin layer of about 2 cm in depth. The tray was then placed in a freezer for 8 hours resulting in a solid sheet. The solid sheet was placed in a plastic bag and vacuumed sealed under reduced pressure for one hour. The tray was removed from the bag and placed in an oven for 1 hour. The tray cooled to ambient temperature and then the thin layer was scraped with a scraper to afford a powder. If clumping occurred, a mortar and pestle was used to make a finer powder. The micelles were measured with a refractometer.

Example 3

THCV was purified, via chromatography, from a plant of genus cannabis, resulting in a clear, slightly yellow oil. The oil weighed 5.00 g. In a separate container 20.0 g of Vitamin E TPGS was measured. Both compounds were combined in a container with 50 mL of water. The solution was sonicated for 15-20 minutes until a homogeneous mixture was formed.

The solution was transferred to a tray, forming a thin layer of about 2 cm in depth. The tray was then placed in a freezer for 8 hours resulting in a solid sheet. The solid sheet was placed in a plastic bag and vacuumed sealed under reduced pressure for one hour. The tray was removed from the bag and placed in an oven for 1 hour. The tray cooled to ambient temperature and then the thin layer was scraped with a scraper to afford a powder. If clumping occurred, a mortar and pestle was used to make a finer powder. The micelles were measured with a refractometer.

Example 4

THC, CBD, and CBGV were purified, via chromatography, from a plant of genus cannabis, resulting in a clear, slightly yellow oil. The oil weighed 5.00 g. In a separate container 20.0 g of Vitamin E TPGS was measured. Both compounds were combined in a container with 50 mL of water. The solution was sonicated for 15-20 minutes until a homogeneous mixture was formed.

The solution was transferred to a tray, forming a thin layer of about 2 cm in depth. The tray was then placed in a freezer for 8 hours resulting in a solid sheet. The solid sheet was placed in a plastic bag and vacuumed sealed under reduced pressure for one hour. The tray was removed from the bag and placed in an oven for 1 hour. The tray cooled to ambient temperature and then the thin layer was scraped with a scraper to afford a powder. If clumping occurred, a mortar and pestle was used to make a finer powder. The micelles were measured with a refractometer.

Example 5

THC, CBD, and THCV were purified, via chromatography, from a plant of genus cannabis, resulting in a clear, slightly yellow oil. Alpha-Pinene, Alpha-Humulene, and Terpinolene were each purified from plant matter via chromatography. The purified terpenes were added to the cannabis oil. The final cannabinoid and terpene oil weighed 5.00 grams. In a separate container 20.0 g of Vitamin E TPGS was measured. The cannabinoid and terpene oil and Vitamin E TPGS were combined in a separate container with 50 mL of water. The solution was sonicated for 15-20 minutes until a homogeneous mixture was formed.

The solution was transferred to a tray, forming a thin layer of about 2 cm in depth. The tray was then placed in a freezer for 8 hours resulting in a solid sheet. The solid sheet was placed in a plastic bag and vacuumed sealed under reduced pressure for one hour. The tray was removed from the bag and placed in an oven for 1 hour. The tray cooled to ambient temperature and then the thin layer was scraped with a scraper to afford a powder. If clumping occurred, a mortar and pestle was used to make a finer powder. The micelles were measured with a refractometer.

Example 6

THC, CBD, and THCV were purified, via chromatography, from a plant of genus cannabis, resulting in a clear, slightly yellow oil. Linalool, Alpha-Pinene, Eucalyptol, Pulegone and Terpinolene were each purified from plant matter via chromatography. The purified terpenes were added to the cannabis oil. The final cannabinoid and terpene oil weighed 5.00 grams. In a separate container 20.0 g of Vitamin E TPGS was measured. The cannabinoid and terpene oil and Vitamin E TPGS were combined in a separate container with 50 mL of water. The solution was sonicated for 15-20 minutes until a homogeneous mixture was formed.

The solution was transferred to a tray, forming a thin layer of about 2 cm in depth. The tray was then placed in a freezer for 8 hours resulting in a solid sheet. The solid sheet was placed in a plastic bag and vacuumed sealed under reduced pressure for one hour. The tray was removed from the bag and placed in an oven for 1 hour. The tray cooled to ambient temperature and then the thin layer was scraped with a scraper to afford a powder. If clumping occurred, a mortar and pestle was used to make a finer powder. The micelles were measured with a refractometer.

Example 7

THC, CBD, and THCV were purified, via chromatography, from a plant of genus cannabis, resulting in a clear, slightly yellow oil. Beta-Caryophyllene, Linalool, and Terpineol were each purified from plant matter via chromatography. The purified terpenes were added to the cannabis oil. The final cannabinoid and terpene oil weighed 5.00 grams. In a separate container 20.0 g of Vitamin E TPGS was measured. The cannabinoid and terpene oil and Vitamin E TPGS were combined in a separate container with 50 mL of water. The solution was sonicated for 15-20 minutes until a homogeneous mixture was formed.

The solution was transferred to a tray, forming a thin layer of about 2 cm in depth. The tray was then placed in a freezer for 8 hours resulting in a solid sheet. The solid sheet was placed in a plastic bag and vacuumed sealed under reduced pressure for one hour. The tray was removed from the bag and placed in an oven for 1 hour. The tray cooled to ambient temperature and then the thin layer was scraped with a scraper to afford a powder. If clumping occurred, a mortar and pestle was used to make a finer powder. The micelles were measured with a refractometer.

Example 8

THC, CBD, and THCV were purified, via chromatography, from a plant of genus cannabis, resulting in a clear, slightly yellow oil. Beta-Caryophyllene, Linalool, and Cymene were each purified from plant matter via chromatography. The purified terpenes were added to the cannabis oil. The final cannabinoid and terpene oil weighed 5.00 grams. In a separate container 20.0 g of Vitamin E TPGS was measured. The cannabinoid and terpene oil and Vitamin E TPGS were combined in a separate container with 50 mL of water. The solution was sonicated for 15-20 minutes until a homogeneous mixture was formed.

The solution was transferred to a tray, forming a thin layer of about 2 cm in depth. The tray was then placed in a freezer for 8 hours resulting in a solid sheet. The solid sheet was placed in a plastic bag and vacuumed sealed under reduced pressure for one hour. The tray was removed from the bag and placed in an oven for 1 hour. The tray cooled to ambient temperature and then the thin layer was scraped with a scraper to afford a powder. If clumping occurred, a mortar and pestle was used to make a finer powder. The micelles were measured with a refractometer.

Example 9

THC, CBD, and THCV were purified, via chromatography, from a plant of genus cannabis, resulting in a clear, slightly yellow oil. Alpha-Pinene, Linalool, Cymene, and Terpineol were each purified from plant matter via chromatography. The purified terpenes were added to the cannabis oil. The final cannabinoid and terpene oil weighed 5.00 grams. In a separate container 20.0 g of Vitamin E TPGS was measured. The cannabinoid and terpene oil and Vitamin E TPGS were combined in a separate container with 50 mL of water. The solution was sonicated for 15-20 minutes until a homogeneous mixture was formed.

The solution was transferred to a tray, forming a thin layer of about 2 cm in depth. The tray was then placed in a freezer for 8 hours resulting in a solid sheet. The solid sheet was placed in a plastic bag and vacuumed sealed under reduced pressure for one hour. The tray was removed from the bag and placed in an oven for 1 hour. The tray cooled to ambient temperature and then the thin layer was scraped with a scraper to afford a powder. If clumping occurred, a mortar and pestle was used to make a finer powder. The micelles were measured with a refractometer.

Example 10

THCA, CBC, THC, CBN, CBD, CBG, CBGA, and CBDA were purified, via chromatography, from a plant of genus cannabis, resulting in a clear, slightly yellow oil. The cannabinoid oil weighed 5.00 grams. In a separate container 20.0 g of Vitamin E TPGS was measured. The cannabinoid and terpene oil and Vitamin E TPGS were combined in a separate container with 50 mL of water. The solution was sonicated for 15-20 minutes until a homogeneous mixture was formed.

The solution was transferred to a tray, forming a thin layer of about 2 cm in depth. The tray was then placed in a freezer for 8 hours resulting in a solid sheet. The solid sheet was placed in a plastic bag and vacuumed sealed under reduced pressure for one hour. The tray was removed from the bag and placed in an oven for 1 hour. The tray cooled to ambient temperature and then the thin layer was scraped with a scraper to afford a powder. If clumping occurred, a mortar and pestle was used to make a finer powder. The micelles were measured with a refractometer.

Example 11

THC was purified, via chromatography, from a plant of genus cannabis, resulting in a clear, slightly yellow oil. The oil weighed 5.00 g. In a separate container 20.0 g of Vitamin E TPGS was measured. Both compounds were combined in a heat proof beaker and placed on a hot plate. The mixture was heated to 80 degrees Celsius. After the mixture reached 80 degrees Celsius, water was added while stirring until the mixture turned into a viscous, amorphous mass. The beaker was removed from the hot plate and the mixture allowed to cool to room temperature while stirring resulting in an aqueous solution.

Example 12

CBD was purified, via chromatography, from a plant of genus cannabis, resulting in a clear, slightly yellow oil. The oil weighed 5.00 g. In a separate container 20.0 g of Vitamin E TPGS was measured. Both compounds were combined in a heat proof beaker and placed on a hot plate. The mixture was heated to 80 degrees Celsius. After the mixture reached 80 degrees Celsius, water was added while stirring until the mixture turned into a viscous, amorphous mass. The beaker was removed from the hot plate and the mixture allowed to cool to room temperature while stirring resulting in an aqueous solution.

Example 13

THCV was purified, via chromatography, from a plant of genus cannabis, resulting in a clear, slightly yellow oil. The oil weighed 5.00 g. In a separate container 20.0 g of Vitamin E TPGS was measured. Both compounds were combined in a heat proof beaker and placed on a hot plate. The mixture was heated to 80 degrees Celsius. After the mixture reached 80 degrees Celsius, water was added while stirring until the mixture turned into a viscous, amorphous mass. The beaker was removed from the hot plate and the mixture allowed to cool to room temperature while stirring resulting in an aqueous solution.

Example 14

THC, CBD, and CBGV were purified, via chromatography, from a plant of genus cannabis, resulting in a clear, slightly yellow oil. The oil weighed 5.00 g. In a separate container 20.0 g of Vitamin E TPGS was measured. Both compounds were combined in a heat proof beaker and placed on a hot plate. The mixture was heated to 80 degrees Celsius. After the mixture reached 80 degrees Celsius, water was added while stirring until the mixture turned into a viscous, amorphous mass. The beaker was removed from the hot plate and the mixture allowed to cool to room temperature while stirring resulting in an aqueous solution.

Example 15

THC, CBD, and THCV were purified, via chromatography, from a plant of genus cannabis, resulting in a clear, slightly yellow oil. Alpha-Pinene, Alpha-Humulene, and Terpinolene were each purified from plant matter via chromatography. The purified terpenes were added to the cannabis oil. The final cannabinoid and terpene oil weighed 5.00 grams.

In a separate container 20.0 g of Vitamin E TPGS was measured. The cannabinoid and terpene oil was combined with Vitamin E TPGS in a heat proof beaker and placed on a hot plate. The mixture was heated to 80 degrees Celsius. After the mixture reached 80 degrees Celsius, water was added while stirring until the mixture turned into a viscous, amorphous mass. The beaker was removed from the hot plate and the mixture allowed to cool to room temperature while stirring resulting in an aqueous solution.

Example 16

THC, CBD, and THCV were purified, via chromatography, from a plant of genus cannabis, resulting in a clear, slightly yellow oil. Linalool, Alpha-Pinene, Eucalyptol, Pulegone and Terpinolene were each purified from plant matter via chromatography. The purified terpenes were added to the cannabis oil. The final cannabinoid and terpene oil weighed 5.00 grams.

In a separate container 20.0 g of Vitamin E TPGS was measured. The cannabinoid and terpene oil was combined with Vitamin E TPGS in a heat proof beaker and placed on a hot plate. The mixture was heated to 80 degrees Celsius. After the mixture reached 80 degrees Celsius, water was added while stirring until the mixture turned into a viscous, amorphous mass. The beaker was removed from the hot plate and the mixture allowed to cool to room temperature while stirring resulting in an aqueous solution.

Example 17

THC, CBD, and THCV were purified, via chromatography, from a plant of genus cannabis, resulting in a clear, slightly yellow oil. Beta-Caryophyllene, Linalool, and Terpineol were each purified from plant matter via chromatography. The purified terpenes were added to the cannabis oil. The final cannabinoid and terpene oil weighed 5.00 grams.

In a separate container 20.0 g of Vitamin E TPGS was measured. The cannabinoid and terpene oil was combined with Vitamin E TPGS in a heat proof beaker and placed on a hot plate. The mixture was heated to 80 degrees Celsius. After the mixture reached 80 degrees Celsius, water was added while stirring until the mixture turned into a viscous, amorphous mass. The beaker was removed from the hot plate and the mixture allowed to cool to room temperature while stirring resulting in an aqueous solution.

Example 18

THC, CBD, and THCV were purified, via chromatography, from a plant of genus cannabis, resulting in a clear, slightly yellow oil. Beta-Caryophyllene, Linalool, and Cymene were each purified from plant matter via chromatography. The purified terpenes were added to the cannabis oil. The final cannabinoid and terpene oil weighed 5.00 grams.

In a separate container 20.0 g of Vitamin E TPGS was measured. The cannabinoid and terpene oil was combined with Vitamin E TPGS in a heat proof beaker and placed on a hot plate. The mixture was heated to 80 degrees Celsius. After the mixture reached 80 degrees Celsius, water was added while stirring until the mixture turned into a viscous, amorphous mass. The beaker was removed from the hot plate and the mixture allowed to cool to room temperature while stirring resulting in an aqueous solution.

Example 19

THC, CBD, and THCV were purified, via chromatography, from a plant of genus cannabis, resulting in a clear, slightly yellow oil. Alpha-Pinene, Linalool, Cymene, and Terpineol were each purified from plant matter via chromatography. The purified terpenes were added to the cannabis oil. The final cannabinoid and terpene oil weighed 5.00 grams.

In a separate container 20.0 g of Vitamin E TPGS was measured. The cannabinoid and terpene oil was combined with Vitamin E TPGS in a heat proof beaker and placed on a hot plate. The mixture was heated to 80 degrees Celsius. After the mixture reached 80 degrees Celsius, water was added while stirring until the mixture turned into a viscous, amorphous mass. The beaker was removed from the hot plate and the mixture allowed to cool to room temperature while stirring resulting in an aqueous solution.

Example 20

THCA, CBC, THC, CBN, CBD, CBG, CBGA, and CBDA were purified, via chromatography, from a plant of genus cannabis, resulting in a clear, slightly yellow oil. The oil weighed 5.00 grams.

In a separate container 20.0 g of Vitamin E TPGS was measured. The cannabinoid oil was combined with Vitamin E TPGS in a heat proof beaker and placed on a hot plate. The mixture was heated to 80 degrees Celsius. After the mixture reached 80 degrees Celsius, water was added while stirring until the mixture turned into a viscous, amorphous mass. The beaker was removed from the hot plate and the mixture allowed to cool to room temperature while stirring resulting in an aqueous solution.

Example 21

In this Example, various liquid formulations according to the invention were prepared using the following general method.

TPGS and cannabinoid(s) were measured into a first container and then the first container was placed into a 60-80° C. water-bath until the TPGS melted. The two components were stirred thoroughly until homogeneous.

Distilled water was measured into a second container and then the second container was placed into a 60-80° C. water-bath.

Additional components were then added to either the first container or the second container based on the relative solubility of the component in each of the first container and the second container.

The heated TPGS mixture and distilled water were both removed from the water bath.

The heated TPGS mixture was poured into the second container containing water with stirring. The resulting mixture immediately started to thicken.

The resulting mixture was stirred until it cooled to room temperature and then was placed into a refrigerator. As the resulting mixture cooled, it's viscosity decreased to water-like levels.

The resulting mixture was diluted to final volume with distilled water.

The following table provides formulations that provided suitable formulations according to the invention. Values in the table have been normalized to a total amount of 100 g for the sake of easier comparison.

| Cannabinoid | 89% THC | 99% CBD | 98% CBD | 98% CBD | 98% CBD | 99% CBD | 99% CBD | 99% CBD | 99% CBD | 99% CBD |
|---|---|---|---|---|---|---|---|---|---|---|
| TPGS (g) | 12.85 | 18.85 | 80.00 | 60.00 | 73.00 | 13.50 | 13.50 | 13.50 | 13.50 | 13.50 |
| Cannabinoids (g) | 1.10 | 1.00 | 20.00 | 40.00 | 27.00 | 5.00 | 5.00 | 5.00 | 5.00 | 5.00 |
| Maisine (g) | | | | | | | 1.00 | 1.00 | 1.00 | |
| Glycerine (g) | | | | | | 80.50 | 50.50 | 44.50 | 44.80 | |
| Q-Naturale 200-V (g) | | | | | | | | | | |
| Gun Arabic (g) | | | | | | | | | | |
| Sodium Benzoate (g) | 0.10 | 0.10 | | | | | | | | |
| bitter block (mL) | 0.30 | 0.30 | | | | | | | | |
| Citric Acid (g) | 0.25 | 0.25 | | | | | | | | |
| Distilled Water (g) | 85.40 | 79.50 | | | 81.50 | | 30.00 | 36.00 | 36.70 | |
| Total (g) | 100 | 100 | 100 | 100 | 100 | 100 | 100 | 100 | 100 | 100 |

| Cannabinoid | 99% CBD | 99% CBD | 99% CBD | 99% CBD | 99% CBD | 99% CBD | 99% CBD | 99% CBD | 99% CBD |
|---|---|---|---|---|---|---|---|---|---|
| TPGS (g) | 1.00 | 3.00 | 0.50 | 0.50 | 1.00 | 1.50 | 1.00 | 0.50 | 6.75 |
| Cannabinoids (g) | 1.00 | 1.00 | 1.00 | 1.00 | 1.00 | 1.00 | 1.00 | 1.00 | 2.75 |
| Maisine (g) | 2.33 | 2.33 | 2.33 | 2.33 | 2.33 | 2.33 | 2.33 | 2.33 | 1.00 |
| Glycerine (g) | 83.67 | 78.67 | 88.17 | 88.17 | 91.67 | 95.17 | 91.67 | 88.17 | 45.00 |
| Q-Naturale 200-V (g) | 12.00 | 12.00 | | 8.00 | 4.00 | | | 4.00 | 5.00 |
| Gun Arabic (g) | | 3.00 | 8.00 | | | | 4.00 | 4.00 | |
| Sodium Benzoate (g) | | | | | | | | | |
| bitter block (mL) | | | | | | | | | |
| Citric Acid (g) | | | | | | | | | |
| Distilled Water (g) | | | | | | | | | 39.50 |
| Total (g) | 100 | 100 | 100 | 100 | 100 | 100 | 100 | 100 | 100 |

Example 22

In this Example, various powder formulations according to the invention were prepared using the following general method.
  TPGS and cannabinoid(s) were measured into a first container and then microwaved until the mixture reached ~75 C.
  The mixture was gently mixed until all was dissolved.
  Absolute ethanol was added to the TPGS/cannabinoid melt and mixed until homogenous.
  Inulin was measured and added to a second container containing water and then heated gently until dissolved.
  Additional components were then added to either the first container or the second container based on the relative solubility of the component in each of the first container and the second container.
  The ethanol/TPGS/cannabinoid mix was poured into the second container containing inulin/water. A very turbid micro-emulsion formed instantly (self-assembling) and resembled 2% milk.
  A B-290 Spray Dryer was used to generate the powder.

The following table provides formulations that provided suitable formulations according to the invention. Values in the table have been normalized to a total amount of 100 g for the sake of easier comparison.

| | | | | | | | | | | | |
|---|---|---|---|---|---|---|---|---|---|---|---|
| TPGS (g) | 26.98 | 30.00 | 25.20 | 27.00 | 26.97 | 25.23 | 21.14 | 25.23 | 27.00 | 23.00 | 10.00 |
| CBD (g) | 10.10 | 20.00 | 15.92 | 10.00 | 10.04 | 11.21 | 18.79 | 15.89 | 10.00 | 2.00 | 10.00 |
| Inulin (g) | 62.92 | 50.00 | 49.45 | 58.00 | 57.67 | 49.53 | 45.42 | 49.53 | 48.00 | | 56.00 |
| Inositol (g) | | | | | | | | | | 75.00 | |
| Pectin (g) | | | | | | | | | | | 24.00 |
| Maltodextrin (g) | | | 4.75 | | | 9.35 | 7.83 | 4.67 | | | |
| Citric Acid (g) | | | 2.35 | | | | 1.72 | 2.34 | | | |
| Malic Acid (g) | | | 2.34 | | | | 1.17 | 2.34 | | | |
| Splenda (g) | | | | | 5.08 | | | | | | |
| Apriva (g) | | | | 5.00 | | | | | | | |
| Sucrose (g) | | | | | | 4.67 | 3.92 | | | | |
| Glycine (g) | | | | | | | | | | 10.00 | |
| Gum Arabic (g) | | | | | | | | | | 5.00 | |
| Cinnamon oil (g) | | | | | 0.24 | | | | | | |
| Total (g) | 100.00 | 100.00 | 100.00 | 100.00 | 100.00 | 100.00 | 100.00 | 100.00 | 100.00 | 100.00 | 100.00 |

Although the present invention herein has been described with reference to various exemplary embodiments, it is to be understood that these embodiments are merely illustrative of the principles and applications of the present invention. Those having skill in the art would recognize that various modifications to the exemplary embodiments may be made, without departing from the scope of the invention.

Moreover, it should be understood that various features and/or characteristics of differing embodiments herein may be combined with one another. It is therefore to be understood that numerous modifications may be made to the illustrative embodiments and that other arrangements may be devised without departing from the scope of the invention.

Furthermore, other embodiments of the invention will be apparent to those skilled in the art from consideration of the specification and practice of the invention disclosed herein. It is intended that the specification and examples be considered as exemplary only, with a scope and spirit being indicated by the claims.

Finally, it is noted that, as used in this specification and the appended claims, the singular forms "a," "an," and "the," include plural referents unless expressly and unequivocally limited to one referent, and vice versa. As used herein, the term "include" or "comprising" and its grammatical variants are intended to be non-limiting, such that recitation of an item or items is not to the exclusion of other like items that can be substituted or added to the recited item(s).

As used herein, the term "about" refers to an approximately +/−10% variation from a given value. It is to be understood that such a variation is always included in any given value provided herein, whether or not it is specifically referred to.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Although individual embodiments are discussed, the disclosure covers all combinations of all those embodiments. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present disclosure. If there is any conflict in the usages of a word or term in this specification and one or more patent(s) or other documents that may be incorporated herein by reference, the definitions that are consistent with this specification should be adopted.

Many obvious variations of the embodiments set out herein will suggest themselves to those skilled in the art in light of the present disclosure. Such obvious variations are within the full intended scope of the appended claims.

What is claimed is:

1. A liquid composition, comprising:
one or more purified cannabinoids selected from the group consisting of D9-THC, D8-THC, THCA, THCV, D8-THCV, D9-THCV, THCVA, CBD, CBDA, CBDV, CBDVA, CBC, CBCA, CBCV, CBCVA, CBG, CBGA, CBGV, CBGVA, CBN, CBNA, CBNV, CBNVA, CBND, CBNDA, CBNDV, CBNDVA, CBE, CBEA, CBEV, CBEVA, CBL, CBLA, CBLV, and CBLVA;
Vitamin E TPGS; and
water,
wherein the liquid composition comprises a ratio of total purified cannabinoid content to Vitamin E TPGS of about 1:11 to about 1:50 by weight.

2. The liquid composition of claim 1, wherein the liquid composition comprises a ratio of total purified cannabinoid content to Vitamin E TPGS of about 1:11 to about 1:40.

3. The liquid composition of claim 1, wherein the liquid composition comprises a ratio of total purified cannabinoid content to Vitamin E TPGS of about 1:11 to about 1:30.

4. The liquid composition of claim 1, wherein the liquid composition comprises a ratio of total purified cannabinoid content to Vitamin E TPGS of about 1:11 to about 1:25.

5. The liquid composition of claim 1, wherein the liquid composition comprises a ratio of total purified cannabinoid content to Vitamin E TPGS of about 1:11 to about 1:20.

6. The liquid composition of claim 1, wherein the liquid composition comprises a ratio of total purified cannabinoid content to Vitamin E TPGS of about 1:20.

7. The liquid composition of claim 1, wherein the liquid composition comprises a ratio of total purified cannabinoid content to Vitamin E TPGS of about 1:19.

8. The liquid composition of claim 1, wherein the liquid composition comprises a ratio of total purified cannabinoid content to Vitamin E TPGS of about 1:18.

9. The liquid composition of claim 1, wherein the one or more purified cannabinoids comprise THCA, CBC, THC, CBN, CBD, CBG, CBGA, CBDA, or a combination thereof.

10. The liquid composition of claim 1, wherein the one or more purified cannabinoids comprise CBD, THC, or a combination thereof.

11. The liquid composition of claim 1, wherein the one or more purified cannabinoids comprise a combination of THC and CBD.

12. A liquid composition, comprising:
a first purified cannabinoid selected from the group consisting of D9-THC, D8-THC, THCA, THCV, D8-THCV, D9-THCV, THCVA, CBD, CBDA, CBDV, CBDVA, CBC, CBCA, CBCV, CBCVA, CBG, CBGA, CBGV, CBGVA, CBN, CBNA, CBNV, CBNVA, CBND, CBNDA, CBNDV, CBNDVA, CBE, CBEA, CBEV, CBEVA, CBL, CBLA, CBLV, and CBLVA;
Vitamin E TPGS; and
water,
wherein the liquid composition comprises a ratio of the first purified cannabinoid content to Vitamin E TPGS of about 1:11 to about 1:50 by weight.

13. A liquid composition, comprising:
one or more purified cannabinoids;
Vitamin E TPGS; and
water,
wherein the liquid composition comprises a ratio of total purified cannabinoid content to Vitamin E TPGS of about 1:11 to about 1:50 by weight and the liquid composition does not comprise a TPGS coprecipitate.

14. The liquid composition of claim 13, wherein the liquid composition comprises a ratio of total purified cannabinoid content to Vitamin E TPGS of about 1:11 to about 1:40.

15. The liquid composition of claim 13, wherein the liquid composition comprises a ratio of total purified cannabinoid content to Vitamin E TPGS of about 1:11 to about 1:30.

16. The liquid composition of claim 13, wherein the liquid composition comprises a ratio of total purified cannabinoid content to Vitamin E TPGS of about 1:11 to about 1:25.

17. The liquid composition of claim 13, wherein the liquid composition comprises a ratio of total purified cannabinoid content to Vitamin E TPGS of about 1:11 to about 1:20.

18. The liquid composition of claim 13, wherein the liquid composition comprises a ratio of total purified cannabinoid content to Vitamin E TPGS of about 1:20.

19. The liquid composition of claim 13, wherein the liquid composition comprises a ratio of total purified cannabinoid content to Vitamin E TPGS of about 1:19.

20. The liquid composition of claim 13, wherein the liquid composition comprises a ratio of total purified cannabinoid content to Vitamin E TPGS of about 1:18.

21. The liquid composition of claim 13, wherein the one or more purified cannabinoids comprise THCA, CBC, THC, CBN, CBD, CBG, CBGA, CBDA, or a combination thereof.

22. The liquid composition of claim 13, wherein the one or more purified cannabinoids comprise CBD, THC, or a combination thereof.

23. The liquid composition of claim 13, wherein the one or more purified cannabinoids comprise a combination of THC and CBD.

* * * * *